US012177658B2

(12) United States Patent
Sevindik et al.

(10) Patent No.: US 12,177,658 B2
(45) Date of Patent: *Dec. 24, 2024

(54) METHODS AND APPARATUS FOR SECURE VOICE COMMUNICATIONS

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/111,885

(22) Filed: Feb. 20, 2023

(65) Prior Publication Data

US 2023/0209334 A1 Jun. 29, 2023

Related U.S. Application Data

(63) Continuation of application No. 16/575,290, filed on Sep. 18, 2019, now Pat. No. 11,589,218.

(51) Int. Cl.
| H04W 12/033 | (2021.01) |
| H04B 1/7143 | (2011.01) |
| H04W 8/18 | (2009.01) |
| H04W 16/14 | (2009.01) |
| H04W 76/15 | (2018.01) |

(52) U.S. Cl.
CPC ........ *H04W 12/033* (2021.01); *H04B 1/7143* (2013.01); *H04W 8/183* (2013.01); *H04W 16/14* (2013.01); *H04W 76/15* (2018.02)

(58) Field of Classification Search
None
See application file for complete search history.

*Primary Examiner* — Faruk Hamza
*Assistant Examiner* — Cassandra L Decker
(74) *Attorney, Agent, or Firm* — Straub & Straub; Michael P. Straub; Stephen T. Straub

(57) ABSTRACT

A first dual SIM user equipment (UE) has a first wireless connection to first Citizens Broadband radio Services Devices (CBSD) of a first network and a second wireless connection to a second CBSD of a second network. Different encryption and different frequency hopping patterns are used with regard to communicating the same voice packet information over the first and second wireless connections. The same voice information is attempted to be redundantly communicated over the two connections, e.g. concurrently or with a slight delay with regard to the two connections. The CBRS communications are typically less reliable than cellular licensed spectrum communications, and a particular encrypted voice packet may, and sometimes is lost; however, the redundancy is used to compensate for expected losses. Successfully recovered encrypted voice packets are sent from the CBSDs to a packet synchronizer which performs decryption and combines the recovered packets into a single packet stream.

20 Claims, 21 Drawing Sheets

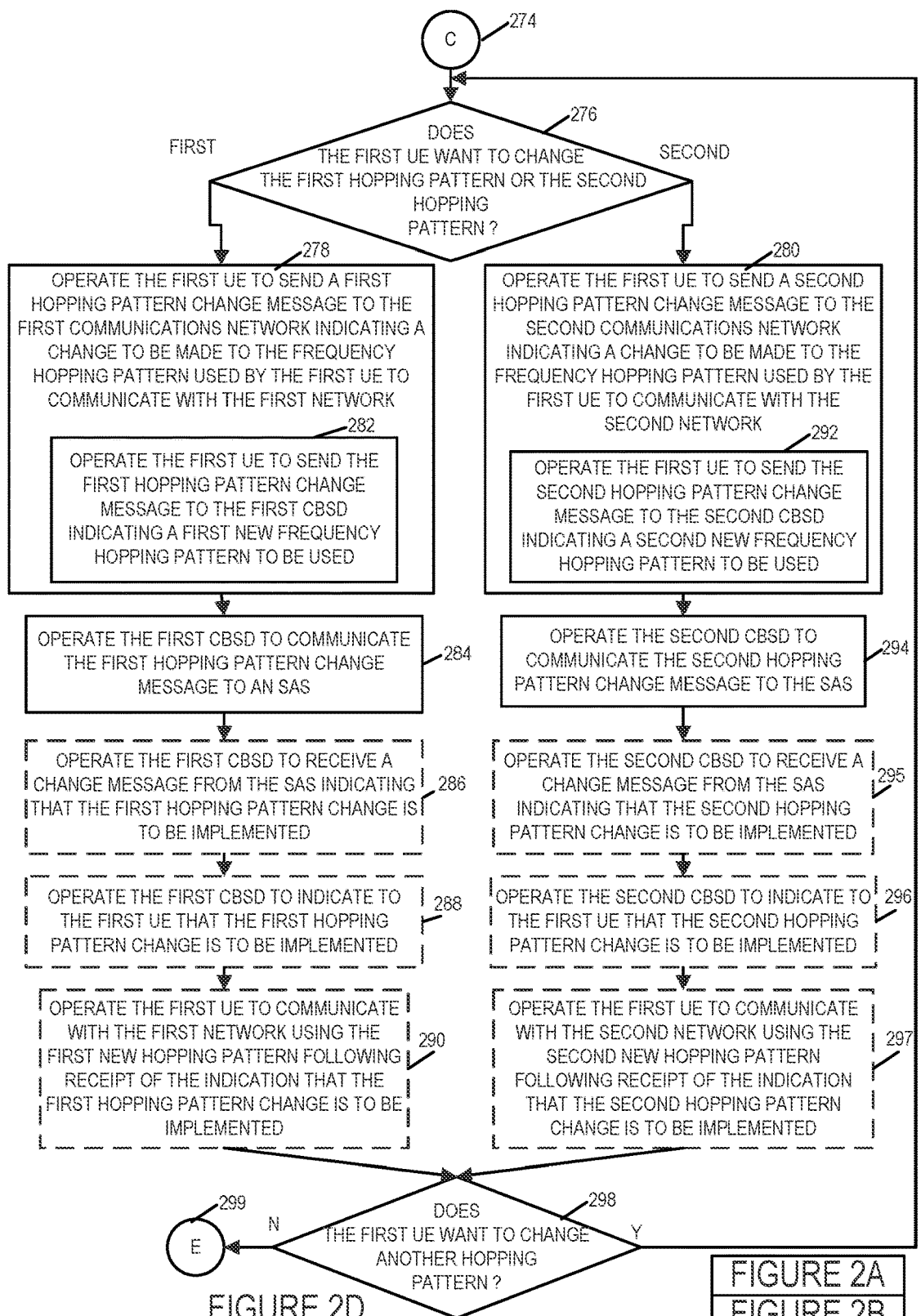

METHODS AND APPARATUS FOR SECURE VOICE COMMUNICATIONS

RELATED APPLICATIONS

The present application is a continuation of U.S. patent application Ser. No. 16/575,290 filed on Sep. 18, 2019 and published as US 2021-0084488 A1 on Mar. 18, 2021, said application and publication hereby being expressly incorporated by reference in their entirety.

FIELD

The present application relates to communications methods and apparatus, and more particularly, to facilitating reliable and secure communications, e.g., when using Citizens Broadband Radio Services (CBRS) for communicating voice data.

BACKGROUND

With the implementation of Citizens Broadband Radio Services, and the expected widespread implementation and availability of numerous small cell Citizens Broadband radio Services Devices (CBSDs) by a plurality of service providers, there is an opportunity to support voice communications using CBRS. However, CBRS communications are typically less reliable than cellular communications, and with voice communications maintaining low latency is an important concern. Typical retransmission mechanisms and approaches for identifying, requesting and retransmission a lost voice packet on a single communications channel results in unacceptable delays.

Based on the above, there is a need for new methods and apparatus for supporting voice communications over CBRS. It would be advantageous if any new methods and apparatus for supporting voice communications, which utilize available partner service provider networks, would include features to support secure communications.

SUMMARY

In various embodiments a dual Subscriber Identity module (SIM) user equipment (UE) device has the ability to communicate to two different networks via Citizens Broadband Radio Service Devices (CBSDs), one in each network. In at least some such embodiments, the dual SIM UE includes a first SIM corresponding to a first network and a second SIM corresponding to a second network. For purposes of explaining the invention the dual SIM UE will be referred to as a first UE.

In some embodiments the first UE connects to the first network using information, e.g. first frequency hopping information and first encryption information, stored in the first SIM corresponding to the first network and connects to the second network using information, e.g. second frequency hopping information and second encryption information stored in the second SIM.

To facilitate understanding of the invention, the invention will be explained in the context of a voice call between the first UE and a second UE in which the first UE sends voice data to the second UE and may also receive voice data from the second UE. A device referred to as a packet synchronizer is used to facilitate communication with the second UE which may be located on the same or a different network than the first UE.

The first UE after connection to the first and second networks sends duplicate voice data packets to both the first and second networks with the packets being directed to the second UE which is the other entity in the exemplary call. The first frequency hopping pattern and first encryption algorithm is used to send the voice data packets to the first network and the second frequency hopping pattern and second encryption algorithm is used to send a duplicate copy of the voice data packets to the second network. Some of the packets sent to the first and/or second network may be lost due to wireless signal interference, network congestion and/or for other reasons. The packets corresponding to the call are routed by the first and second networks to a device referred to a packet synchronizer, also sometimes referred to as a VoIP packet synchronizer because the voice data packets which are communicated are in some embodiments VoIP packets, e.g., addressed to the second UE.

The VOIP synchronizer receives the packets corresponding to the call communicated via the first and second networks, decrypts the packets from the first network using the first encryption algorithm, and decrypts the packets received from the second network using the second algorithm. Recovered packets which are duplicative are dropped and a single packet stream including one copy of each unique VoIP packet is sent from the VOIP synchronizer to the second UE to which the packets were directed as part of the call.

Voice data from the second UE that is directed to the first UE as part of a voice call is duplicated and transmitted to the first UE via both the first and second communications networks. Packets sent over the first network are encrypted via the first encryption algorithm by VOIP synchronizer while packets sent over the second network to the UE are encrypted by the VoIP synchronizer in accordance with the second encryption algorithm.

While some packets may be lost as a result of the use of CBSDs for communication, the redundancy provided by the use of duplicate packet streams and two different communications networks increases the chance of reliable communications.

In various embodiments as an added level of security, the first UE device can signal a change in the frequency hopping pattern to be used to communicate with a network. This can be done by the first UE sending a first hopping pattern change message to the first network to change the frequency hopping pattern used to communicate with the first network. The first hopping pattern change message is communicated to a first CBSD in the first network which then communicates the hopping change message to an SAS. The SAS which has control over frequency allocation responds to the first CBSD indicating a grant or denial of the requested change. If the SAS responds to the first CBSD indicating that the requested change in the hopping pattern is being granted, the first CBSD signals the first UE that it should proceed with the requested frequency hopping pattern change. In response to the signal indicating the requested first frequency hopping pattern change is being granted, the first UE will begin using the new frequency hopping pattern to communicate with the first CBSD and thus the first network. In addition the first UE can send a second hopping pattern change message to the second network to change the frequency hopping pattern used to communicate with the second network. The second hopping pattern change message is communicated to a second CBSD in the second network which then communicates the hopping change message to an SAS. The SAS which has control over frequency allocation, responds to the second CBSD indicating a grant or denial of the requested change. If the SAS responds to the second CBSD indicating that the requested change in the hopping pattern is being granted, the second CBSD signals the second UE that it should proceed with the requested frequency hopping pattern change. In response to the signal indicating the requested first frequency hopping pattern change is being granted, the first UE will begin using the new frequency hopping pattern to communicate with the second CBSD and thus the first network.

An exemplary communications method, in accordance with some embodiments, comprises: receiving at a first user equipment (UE) device, via a first radio receiver corresponding to a first communications network (radio one) and a first Subscriber Identity Module (SIM), first frequency hopping pattern information, said first frequency hopping pattern information indicating a frequency hopping pattern used for communication with the first network: receiving at the first user equipment device, via a second radio receiver corresponding to a second communications network (radio two) and a second Subscriber Identity Module (SIM), second frequency hopping pattern information, said second frequency hopping pattern information indicating a frequency hopping pattern used for communication with the second network: transmitting, from the first user equipment device, using frequencies determined from the first frequency hopping pattern information, first voice data to the first network, said first voice data being directed to a second UE device; and transmitting, from the first user equipment device, using frequencies determined from the second frequency hopping pattern information, said first voice data to the second network.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 2D is fourth part of a flowchart of an exemplary method of operating a communications system, e.g., the communications system of FIG. 1, in accordance with an exemplary embodiment.

FIG. 2, comprises the combination of FIG. 2A, FIG. 2B, FIG. 2C and FIG. 2D.

DETAILED DESCRIPTION

Figure 1:
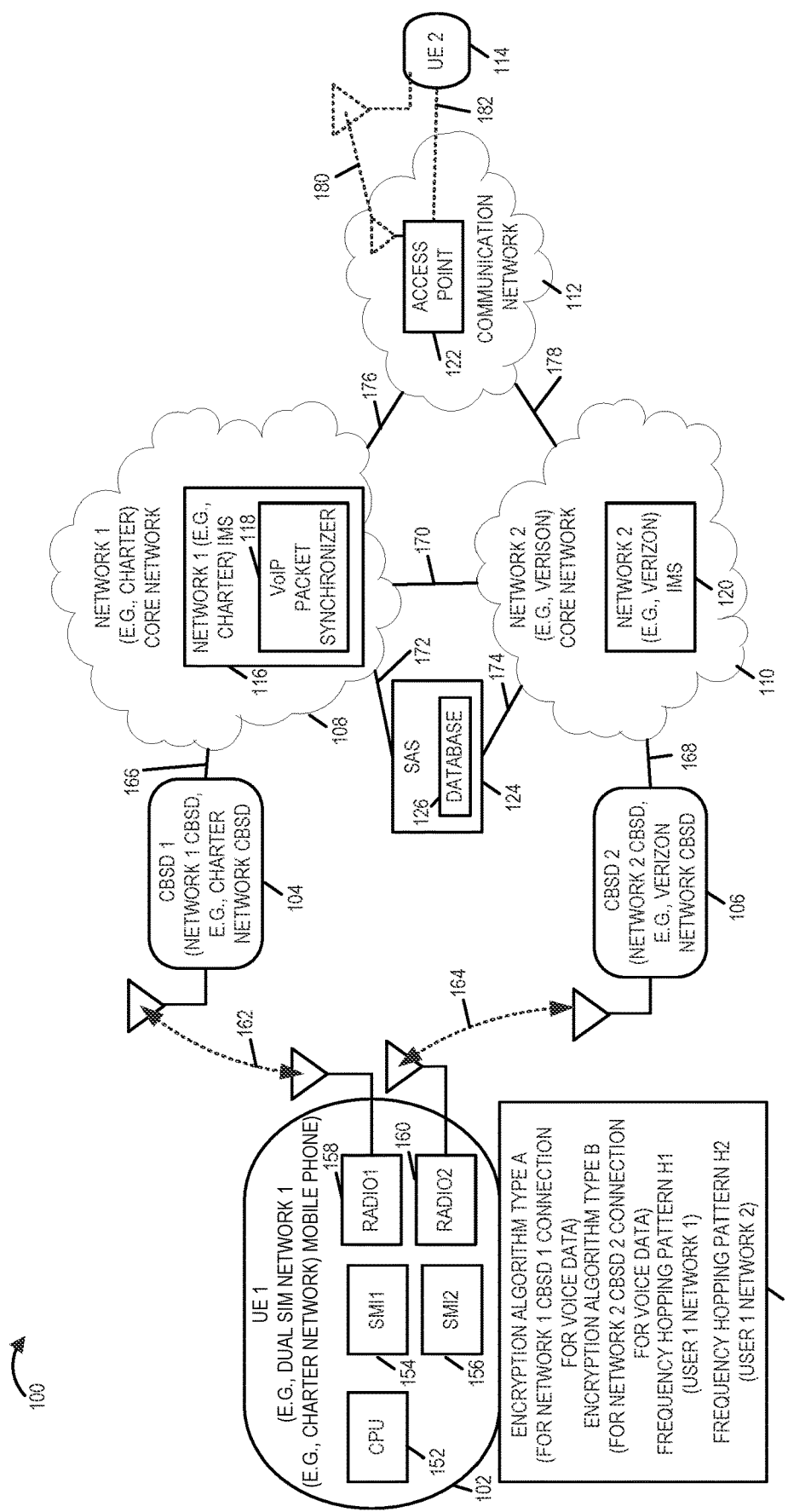
FIG. 1 is a drawing of an exemplary communications system in accordance with an exemplary embodiment.
Figure 2A:
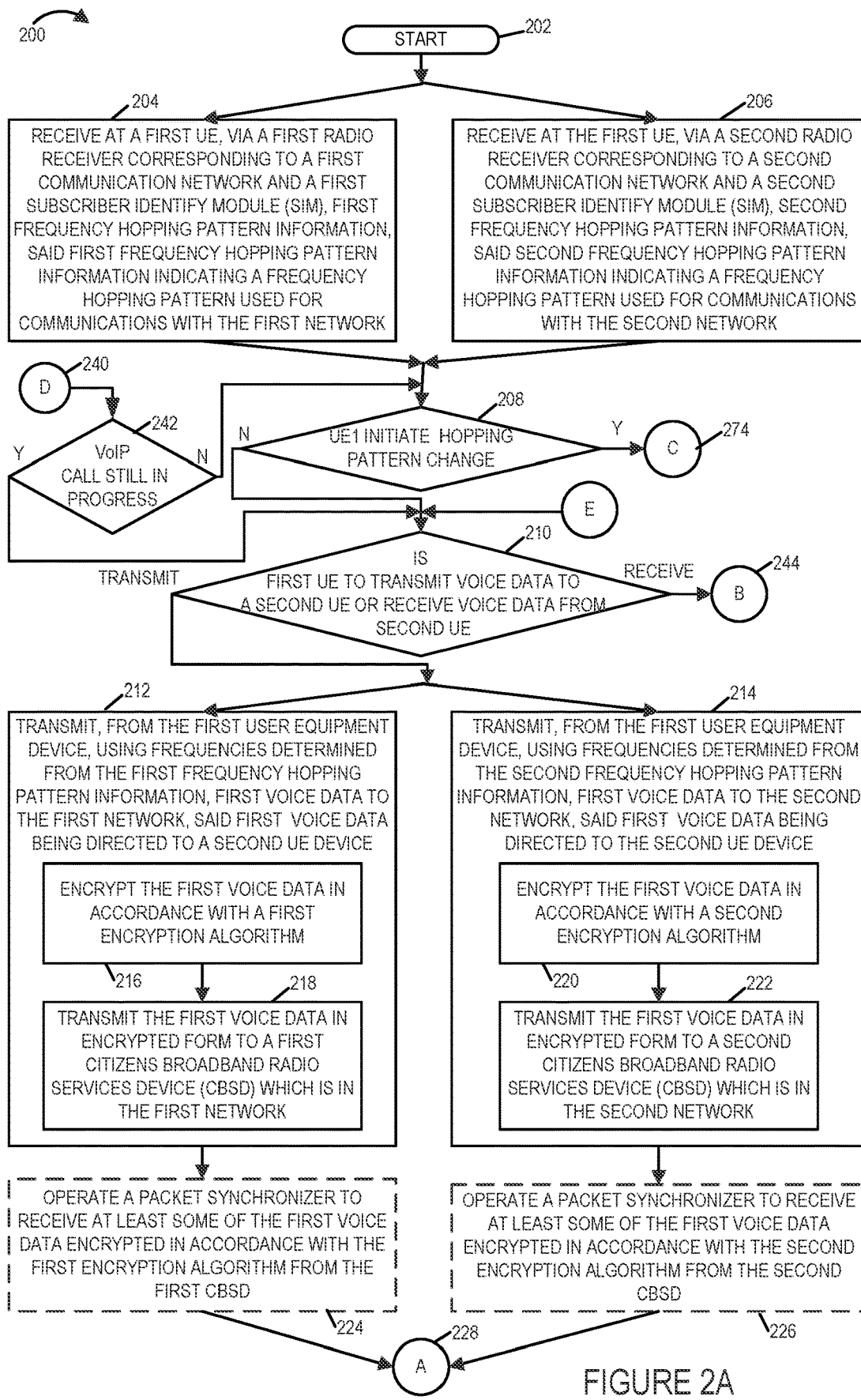
FIG. 2A is a first part of a flowchart of an exemplary method of operating a communications system, e.g., the communications system of FIG. 1, in accordance with an exemplary embodiment.
Figure 2B:
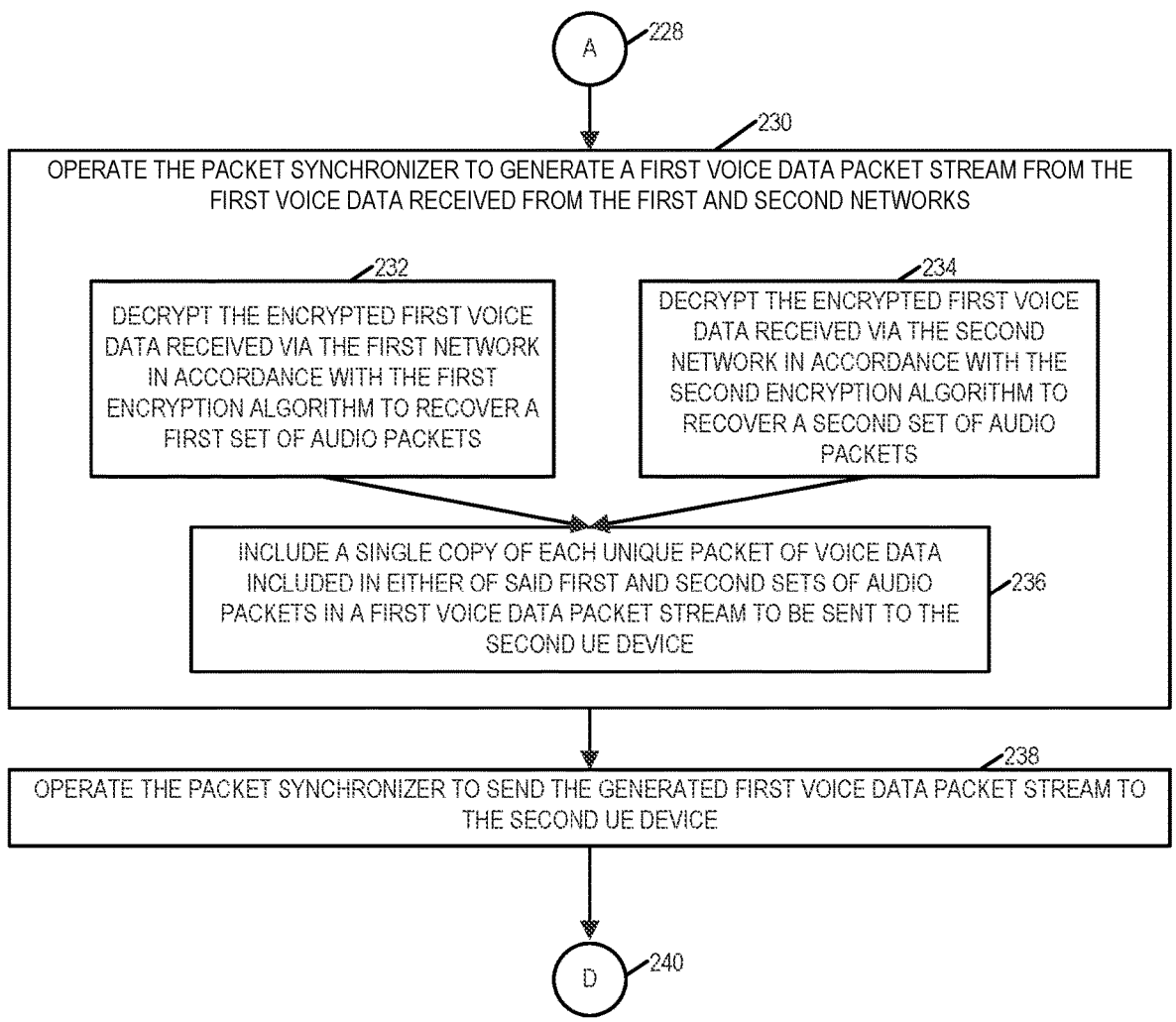
FIG. 2B is a second part of a flowchart of an exemplary method of operating a communications system, e.g., the communications system of FIG. 1, in accordance with an exemplary embodiment.
Figure 2C:
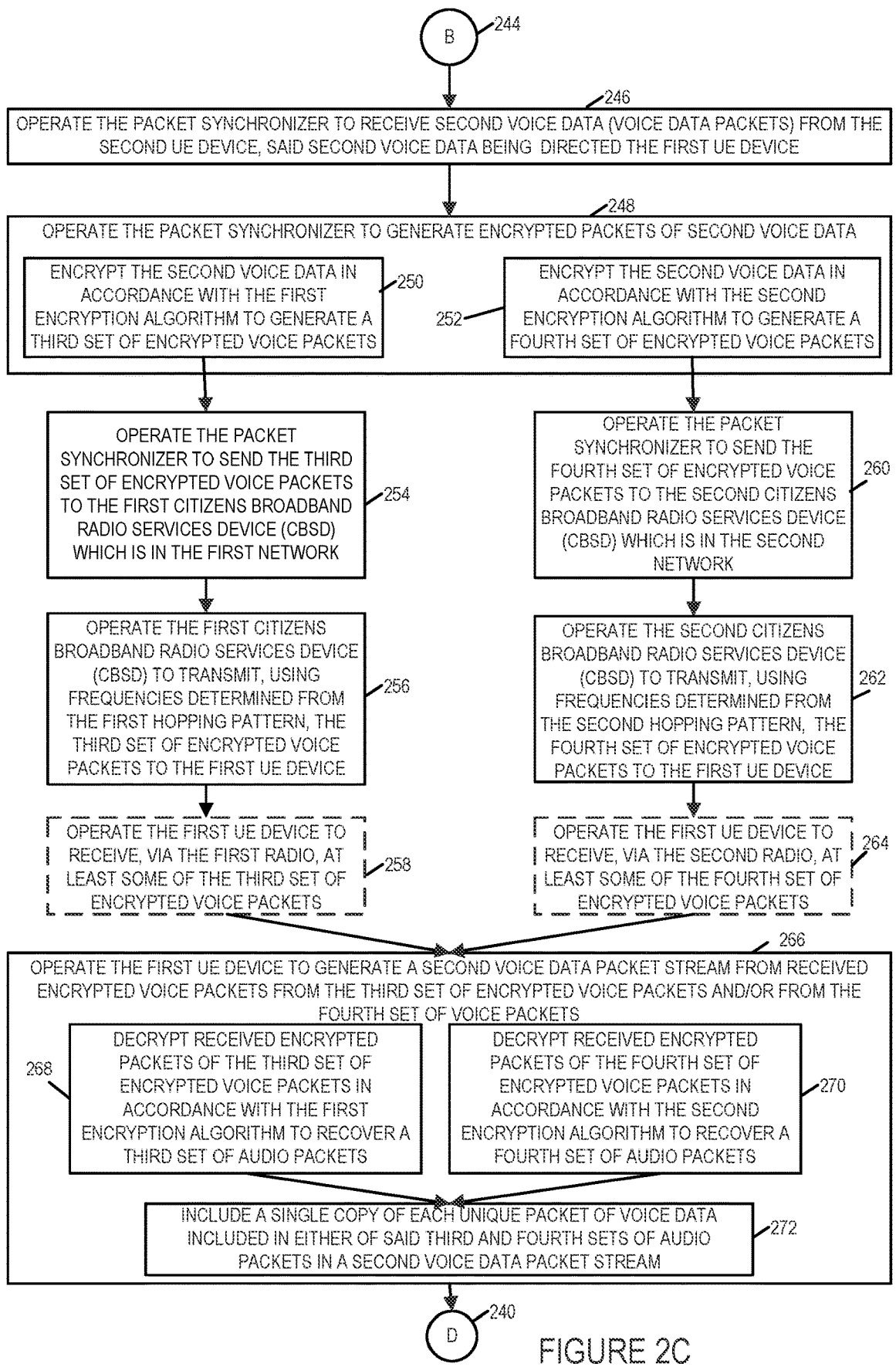
FIG. 2C is a third part of a flowchart of an exemplary method of operating a communications system, e.g., the communications system of FIG. 1, in accordance with an exemplary embodiment.

FIG. 1 is a drawing of an exemplary communications system 100 in accordance with an exemplary embodiment. Communications system 100 includes a plurality of user equipment (UE) devices including UE 1 102 and UE 2 114, a plurality of citizens broadband radio services devices (CBSDs) including CBSD 1 104 and CBSD 2 106, network 1 core network 116, network 2 core network 110, a SAS 124, and a communications network 112. UE 1 is, e.g., a dual SIM network 1, e.g., Charter network, mobile phone. UE 1 102 includes a central processing unit (CPU 152), SIM 1 154, SIM 2 156, radio 1 158 coupled to one or more antennas, and radio 2 160 coupled to one or more antennas. SIM 1 154 is associated with radio 1 158, while SIM 2 156 is associated with radio 2 160. CBSD 1 104 is, e.g., a network 1 CBSD, e.g., a Charter network CBSD. CBSD 2 106 is, e.g., a network 1 CBSD, e.g., a Verizon network CBSD. UE 1 102 is coupled to CBSD 1 104 via wireless communications link 162. UE 1 102 is also coupled to CBSD 2 106 via wireless communications link 166.

A SIM is a subscriber identity module or subscriber identification module (SIM), also widely known as a SIM card. A SIM is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards. SIM cards are used on GSM phones and some CDMA phones, e.g., LTE-capable handsets. SIM cards can also be used in satellite phones, smart watches, computers, or cameras. SIM cards are transferable between different mobile devices. A dual SIM device will normally have two SIM cards. This allows the dual SIM device to have identification information which corresponding to two different networks.

A SIM card normally includes its unique serial number (ICCID), international mobile subscriber identity (IMSI) number, security authentication and ciphering information, temporary information related to the local network, a list of the services the user has access to, and two passwords: a personal identification number (PIN) for ordinary use, and a personal unblocking code (PUC) for PIN unlocking. A device with dual SIMS will in some cases have this information for each of two different networks.

CBSD 1 104 is coupled to network 1 core network 108 via communications link 166. Network 1 core network 108, e.g., a Charter core network, includes a network 1 IMS 116. Network 1 IMS 116 includes a VoIP packet synchronizer 118. CBSD 2 104 is coupled to network 2 core network 110 via communications link 168. Network 2 core network 110, e.g., a Verizon core network, includes a network 2 IMS 120, e.g., a Verizon IMS. Core network 1 108 is coupled to core network 2 118 via communications link 170.

Network 1 core network 108 and network 2 core network 110 are coupled to SAS 124, via communications links 172, 174, respectively. SAS 124 includes a database 126.

Network 1 core network 108 is coupled to communications network 112 via communications link 176. Network 2 core network 119 is coupled to communications network 112 via communications link 178. Communications network 112 includes access point 122, which couples the access point to UE2 via one or both of wireless communications link 180 and wired communications link 182.

Block 103 identifies current encryption and current frequency hopping information corresponding to UE 1 102. UE 1 102 is currently using Encryption algorithm A for the network 1 CBSD connection for voice data. UE 1 102 is currently using Encryption algorithm B for the network 2 CBSD connection for voice data, e.g., where the encryption B algorithm is different from encryption A algorithm. UE 1 102 is currently using frequency hopping pattern H1 for user 1 network 1 communications over link 162. UE 1 102 is currently using frequency hopping pattern H2 for user 1 network 2 communications over link 164. In various embodiments, the particular frequency hopping pattern used can be, and sometimes is, changed, e.g., in response to a request from the UE directed to an SAS and granted by the SAS FIG. 2, comprising the combination of FIG. 2A, FIG. 2B, FIG. 2C and FIG. 2D, is a flowchart 200 of an exemplary method of operating a communications system, e.g., communications system 100, in accordance with an exemplary embodiment. Operation of the exemplary method starts in step 202 in which the communications system is powered on and initialized. Operation proceeds from step 202 to step 204 and 206. In step 204 a first UE device, e.g., UE 1 102 receives via a first radio receiver corresponding to a first communications network and a first subscriber identity module (SIM) first frequency hopping pattern information, said first frequency hopping pattern information indicating a frequency hopping pattern used for communications with the first network. In step 206 the first UE device, e.g., UE 1 102 receives via a second radio receiver corresponding to a second communications network and a second subscriber identity module (SIM), second frequency hopping pattern information, said second frequency hopping pattern information indicating a frequency hopping pattern used for communications with the second network. Operation proceeds from step 104 and 206 to step 208.

In step 208 the first UE determines whether or not a frequency hopping pattern change is to be initiated. If the first UE decides that a frequency hopping pattern change is not to be initiated, then operation proceeds from step 208 to step 210. However, if the first UE decides that a frequency hopping pattern change is to be initiated, then operation proceeds from step 208, via connecting node C 274 to step 276.

Returning to step 210, in step 210 if the first UE is to transmit voice data to a second UE, then operation proceeds from step 210 to steps 212 and 214. However, in step 210 if the first UE is to receive voice data from the second UE, then operation proceeds from step 210, via conning node B 244 to step 246.

Returning to steps 212 and 214, in step 212 the first UE device transmits, using frequencies determined from the first frequency hopping pattern information, first voice data to the first network, said first voice data being directed to the second UE device. Step 212 includes steps 216 and 218. In step 216 the first UE device encrypts the first voice data in accordance with a first encryption algorithm. Operation proceeds from step 216 to step 218. In step 218 the first UE device transmits the first data in encrypted form to a first citizens broadband radio services device (CBSD) which is in the first network.

In step 214 the first UE device transmits, using frequencies determined from the second frequency hopping pattern information, first voice data to the first network, said first voice data being directed to the second UE device. Step 214 includes steps 220 and 222. In step 220 the first UE device encrypts the first voice data in accordance with a second encryption algorithm. Operation proceeds from step 220 to step 222. In step 220 the first UE device transmits the first data in encrypted form to a second citizens broadband radio services device (CBSD) which is in the second network.

In some embodiments, the first UE device intentionally delays or offsets transmission of the same voice data being communicated to the first and second networks.

Steps 212 and 214 may be, and sometimes are, performed in parallel. Operation proceeds from step 212 to step 224. In step 224 a packet synchronizer receives at least some of first voice encrypted in accordance with the first encryption algorithm from the first CBSD.

Operation proceeds from step 214 to step 226. In step 226 the packet synchronizer receives at least some of first voice encrypted in accordance with the second encryption algorithm from the second CBSD.

Operation proceeds from steps 224 and 226, via connecting node A 228, to step 230. In step 230 the packet synchronizer is operated to generate a first voice data packet stream from the first voice data received from the first and second networks. Step 230 includes steps 232, 234 and 236. In step 232 the packet synchronizer decrypts the encrypted first voice data received via the first network in accordance with the first encryption algorithm to recover a first set of audio packets. In step 234 the packet synchronizer decrypts the encrypted first voice data received via the first network in accordance with the second encryption algorithm to recover a second set of audio packets. Operation proceeds from step 232 and 234 to step 236. In step 236 the packet synchronizer includes a single copy of each unique packet of voice data included in either of said first and second sets of audio packets in a first voice data packet stream to be sent to the second UE device. Operation proceeds from step 230 to step 238.

In step 238 the packet synchronizer sends the generated first voice data packet stream to the second UE device. Operation proceeds via connecting node D 240 to step 242.

Returning to step 246, in step 246, the packet synchronizer receives second voice data, e.g., voice data packets, from the second UE device, said second voice data being directed to the first UE device. Operation proceeds from step 246 to step 248.

In step 248, the packet synchronizer generated encrypted packets of the second voice data. Step 248 includes steps 250 and 252. In step 250 the packet synchronizer encrypts the second voice data in accordance with the first encryption algorithm to generate a third set of encrypted voice packets. In step 252 the packet synchronizer encrypts the second voice data in accordance with the second encryption algorithm to generate a fourth set of encrypted voice packets.

Operation proceeds from step 250 to step 254, and from step 252 to step 260. In step 254 the packet synchronizer sends the third set of encrypted voice packets to the first CBSD which is in the first network. Operation proceeds from step 254 to step 256. In step 256 the first CBSD transmits, using frequencies determined from the first frequency hopping pattern, the fourth set of encrypted voice packets to the first UE device. Operation proceeds from step 256 to step 258. In step 258 the first UE device receives, via the first radio, at least some of the third set of encrypted voice packets.

Returning to step 260, in step 260 the packet synchronizer sends the fourth set of encrypted voice packets to the second CBSD which is in the second network. Operation proceeds from step 260 to step 262. In step 262 the second CBSD transmits, using frequencies determined from the second frequency hopping pattern, the fourth set of encrypted voice packets to the first UE device. Operation proceeds from step 262 to step 264. In step 264 the first UE device receives, via the second radio, at least some of the fourth set of encrypted voice packets.

Operation proceeds from step 258 and 264 to step 266. In step 266 the first UE device generates a second voice data packet stream from received encrypted voice packets from the third set of encrypted voice packets and/or from the fourth set of encrypted voice packets. Step 266 includes steps 268, 370 and 272. In step 268 the first UE device decrypts received encrypted packets of the third set of encrypted voice packets in accordance with the first encryption algorithm to recover a third set of audio packets. In step 270 the first UE device decrypts received encrypted packets of the fourth set of encrypted voice packets in accordance with the second encryption algorithm to recover a fourth set of audio packets. Operation proceeds from sep 268 and 270 to step 272. In step 272 the first UE device include a single copy of each unique packet of voice data included in either of said third and fourth sets of audio packets in a second voice data packet stream. Operation proceeds from sep 266, via connecting node D 240 to step 242.

In step 242 the first UE device determines whether or not the VOIP call is still in progress. If the determination is that the call is still in progress, then operation proceeds from step 242 to step 210, in which the first UE determines if the first UE is to transmit voice data to the first UE device or receive voice data from the second UE device. However, if the first UE device determines in step 242 the call is no longer in progress, then operation proceeds from step 242 to step 208 in which the first UE determines whether or not the first UE desires to initiate a frequency hopping pattern change. If the first UE determines that it is to initiate a frequency hopping pattern change, then operation proceeds from step 208, via connecting node C 274 to step 276.

In step 276, if the first UE wants to change the first hopping pattern, then operation proceeds from step 276 to step 278: however, if the first UE want to change the second hopping pattern, then operation proceeds from step 276 to step 280.

In step 276 the first UE sends a first hopping pattern change message to the first communications network indicating a change to be made to the frequency hopping pattern used by the first UE to communicate with the first network. Step 280 includes step 282 in which the first UE sends the first hopping pattern change message to the first CBSD indicating a first new frequency hopping pattern to be used. Operation proceeds from step 278 to step 284.

In step 284 the first CBSD communicates the first hopping pattern change message to an SAS. Operation proceeds from step 284 to step 286. In step 286 the first CBSD receives a change message from the SAS indicating that the first hopping pattern change is to be implemented. Operation proceeds from step 286 to step 288. In step 288 the first CBSD indicates to the first UE device that the first hopping pattern change is to be implemented. Operation proceeds from step 288 to step 290. In step 290 the first UE communicates with the first network using the first new hopping pattern following the receipt of the indication that the first hopping pattern change is to be implemented. Operation proceeds from step 290 to step 298.

Returning to step 280, in step 280 the first UE sends a second hopping pattern change message to the second communications network indicating a change to be made to the frequency hopping pattern used by the first UE to communicate with the second network. Step 280 includes step 292 in which the first UE sends the second hopping pattern change message to the second CBSD indicating a second new frequency hopping pattern to be used. Operation proceeds from step 280 to step 294.

In step 294 the first CBSD communicates the second hopping pattern change message to the SAS. Operation proceeds from step 294 to step 295. In step 295 the second CBSD receives a change message from the SAS indicating that the second hopping pattern change is to be implemented. Operation proceeds from step 295 to step 296. In step 296 the second CBSD indicates to the first UE device that the second hopping pattern change is to be implemented. Operation proceeds from step 296 to step 297. In step 297 the first UE communicates with the second using the second new hopping pattern following the receipt of the indication that the second hopping pattern change is to be implemented. Operation proceeds from step 297 to step 298.

In step 298, the first UE determines if the first UE wants to change another hopping pattern. If the first Ue desires to change another hopping pattern, then operation proceeds from step 298 to step 276. However, if the first UE does not desire to change another hopping pattern, then operation proceeds from step 298, via connecting node E 299 to step 210.

Figure 3:
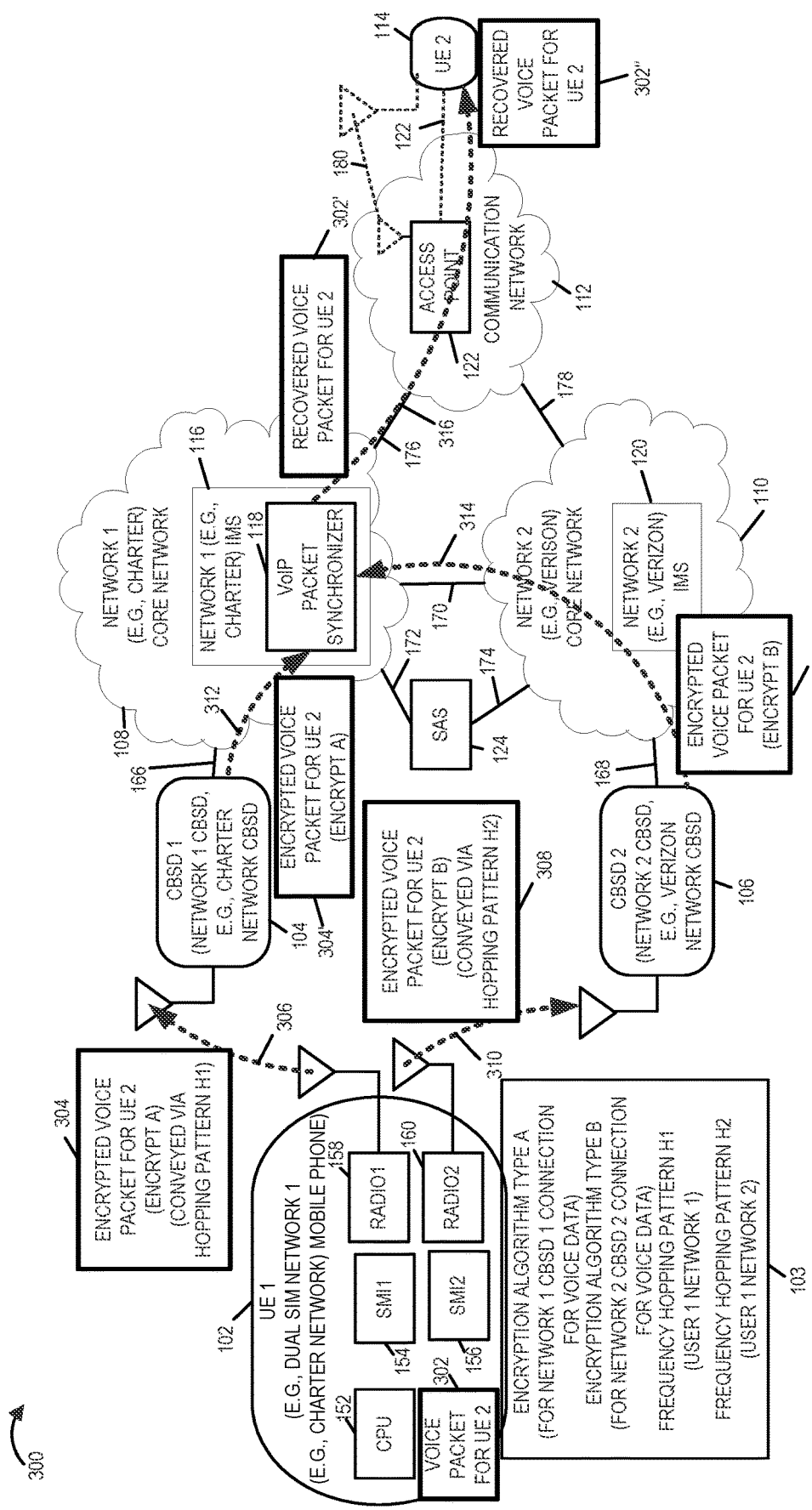
FIG. 3 is a drawing illustrating exemplary voice packet information, being sent from a first UE and being directed to second UE, said first UE being a dual SIM device, in accordance with an exemplary embodiment.

FIG. 3 is a drawing 300 illustrating exemplary voice packet information, being sent from a first UE 102 and being directed to second UE 114, said first UE 102 being a dual SIM device, in accordance with an exemplary embodiment. The first UE, which is UE 1 102, generates, e.g., from received audio input via a microphone of UE 1, a voice packet 302 for UE 2 114. UE 1 102 will attempt to send the information of voice packet 302 via two communications paths.

UE 1 102 uses encryption algorithm A to generate encrypted voice packet for user 2 304 from voice packet for UE 2 302. UE 1 102, uses the frequency hopping pattern H1 to generate signals 306 which conveys encrypted voice packet for UE 2 304, and transmits, via radio 1 158, the generated signals 306 over airlink 162 to CBSD 1 104. CBSD 1 attempts to receive the transmitted encrypted voice packet 304. If CBSD 1 104 successfully recovers the encrypted voice packet 304, CBSD 1 104 sends, e.g., forwards, the encrypted voice packet 304 to VoIP packet synchronizer 118 via signal 312. VoIP packet synchronizer 118 decrypts, e.g., using decryption information corresponding to encryption algorithm type A, the received encrypted packet to obtain the unencrypted voice packet for UE 2.

UE 1 102 uses encryption algorithm B to generate encrypted voice packet for user 2 308 from voice packet for UE 2 302. UE 1 102, uses the frequency hopping pattern H2 to generate signals 310 which conveys encrypted voice packet for UE 2 308, and transmits, via radio 2 160, the generated signals 310 over airlink 164 to CBSD 2 106. CBSD 2 106 attempts to receive the transmitted encrypted voice packet 308. If CBSD 2 106 successfully recovers the encrypted voice packet 308, CBSD 2 106 sends, e.g., forwards, the encrypted voice packet 308 to VoIP packet synchronizer 118 via signal 314. VoIP packet synchronizer 118 decrypts, e.g., using decryption information corresponding to encryption algorithm type B, the received encrypted packet to obtain the unencrypted voice packet for UE 2.

Assuming the packet synchronizer 118 has recovered at least one copy of the unencrypted voice packet for UE2, the packet synchronizer generates and sends signal 316 to UE 2 communicating recovered voice packet for UE 2, identified as packet 302'. UE 2 114 receives signal 316 and recovers the voice packet for UE 2, identified as recovered voice packet 302".

Although shown for a single packet, it should be appreciated that UE1 102 sends multiple voice packets to UE2 114, e.g., using the same mechanism as described with respect to packet 302. The wireless communications link 162 between UE 1 102 and CBSD 1 104 may vary in quality over time and/or be unusable during some time intervals. Similarly, the wireless communications link 164 between UE 1 102 and CBSD 2 106 may vary in quality over time and/or be unusable during some time intervals. During times in which communications link 162 is unusable, communications link 164 may be usable and vice-versa. Thus the redundancy associated with attempting to communicate a VoIP packet via two radio to two CBSDs, e.g., corresponding to different service provider networks, increases the likelihood that the packet will get through to user 2 114.

Figure 4:
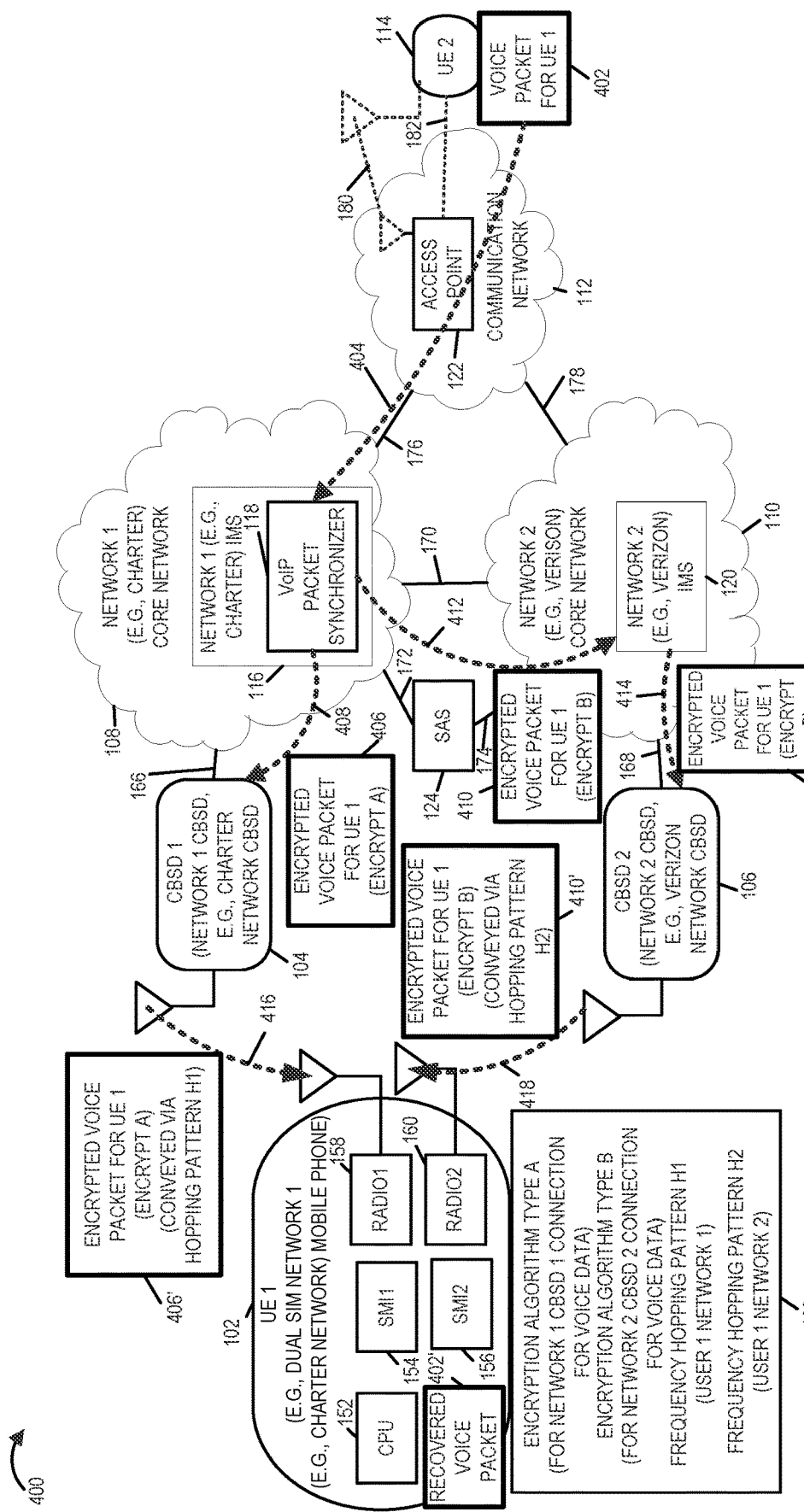
FIG. 4 is a drawing illustrating exemplary voice packet information, being sent from a second UE and being directed to a first UE, said first UE being a dual SIM device, in accordance with an exemplary embodiment.

FIG. 4 is a drawing 400 illustrating exemplary voice packet information, being sent from a second UE 114 and being directed to a first UE 102, said first UE 102 being a dual SIM device, in accordance with an exemplary embodiment. UE 2 114 has voice packet 402 for UE 1. UE 2 generates and sends signal 404 communicating voice packet 402 to VoIP packet synchronizer 118.

VoIP packet synchronizer 118 encrypts the voice packet 402, using encryption type A, generating encrypted voice packet for UE 1 406. VoIP packet synchronizer generates and sends signal 408 to CBSD 1 104, communicating encrypted voice packet 406. CBSD 1 104 receives signal 408 and recovers the encrypted voice packet 406. CBSD1 104, uses frequency hopping pattern H1 information, to generate signals 416, which convey encrypted voice packet 406. CBSD 1 104 transmits generated signals 416 directed to UE 1 102. UE 1 102 attempts to receive, e.g., via radio 1 158, signals 416 and recover the encrypted voice packet 406. If UE 1 102 successfully recovers encrypted voice packet 406, UE 1, uses decryption information for encryption algorithm A, to recover a copy of voice packet 402.

VoIP packet synchronizer 118 also encrypts the voice packet 402, using encryption type B, generating encrypted voice packet for UE 1 410. VoIP packet synchronizer generates and sends signal 412 to network 2 IMS 120, communicating encrypted voice packet 410. Network 2 IMS 120 receives signals 412 generates and sends signal 414 communicating encrypted voice packet 410 to CBSD 2 106. CBSD 2 106 receives signal 414 and recovers the encrypted voice packet 410. CBSD2 106, uses frequency hopping pattern H2 information, to generate signals 418, which convey encrypted voice packet 410. CBSD 2 106 transmits generated signals 418 directed to UE 1 102. UE 1 102 attempts to receive, e.g., via radio 2 160, signals 418 and recover the encrypted voice packet 410. If UE 1 102 successfully recovers encrypted voice packet 410, UE 1, uses decryption information for encryption algorithm B, to recover a copy of voice packet 402. UE 1 102 communicates, e.g. via a speaker in UE 1 102, audio content in recovered voice packet 402" to the user of UE 1 102.

Figure 5:
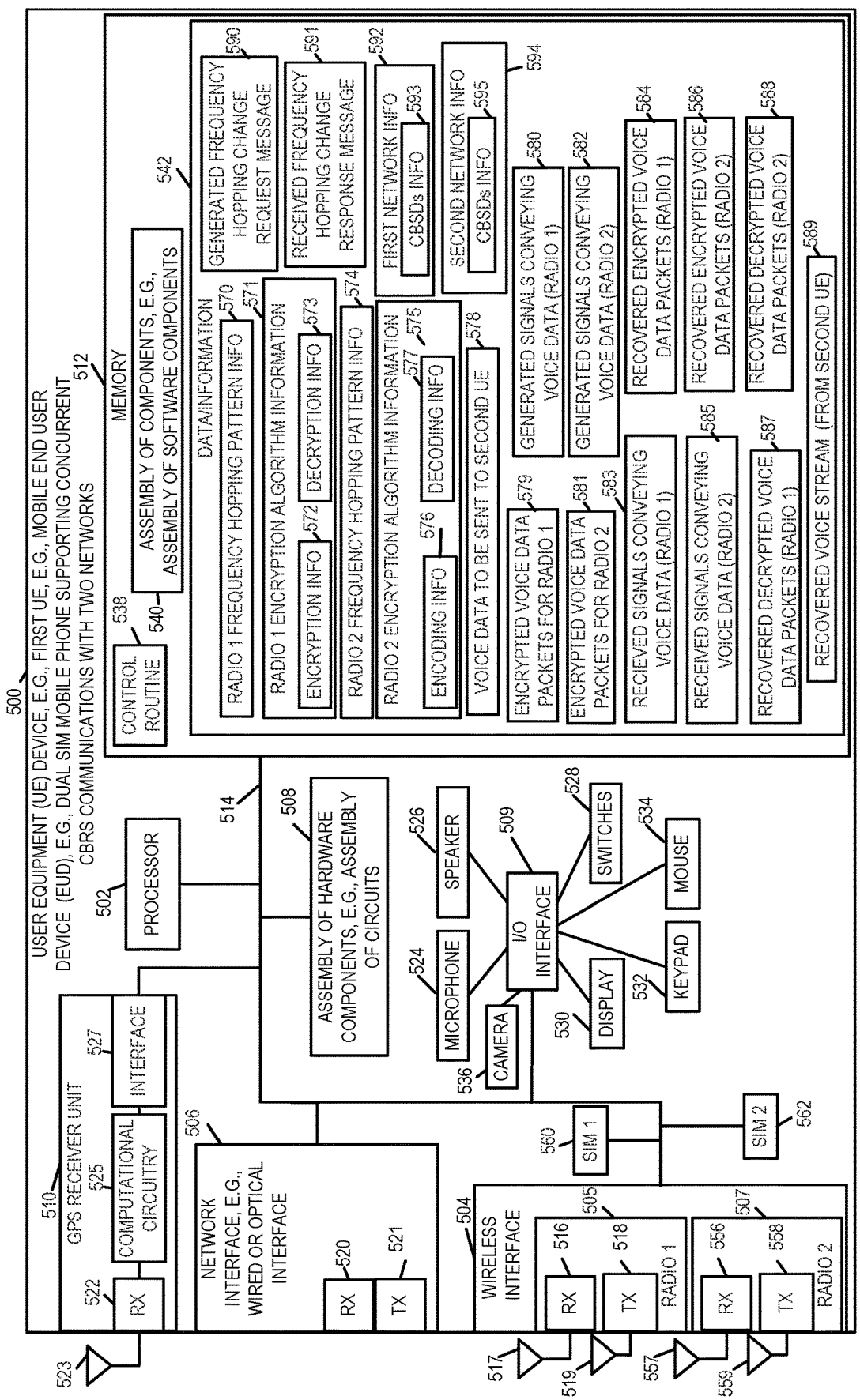
FIG. 5 is a drawing of an exemplary user equipment (UE) device, e.g., a dual SIM mobile phone supporting simultaneous connectivity with two networks, in accordance with an exemplary embodiment.

FIG. 5 is a drawing of an exemplary user equipment (UE) device 500, e.g., a first user equipment (UE) device, e.g., a dual SIM mobile phone supporting simultaneous connectivity with two networks, in accordance with an exemplary embodiment. Exemplary user equipment (UE) device 500, is e.g. a mobile end user device (EUD) supporting concurrent CBRS communications with two communications networks, e.g., corresponding to different service providers, in accordance with an exemplary embodiment. UE device 500 is, e.g., UE 1 102 of FIG. 1, FIG. 3 and FIG. 4, and/or a first UE device implementing steps of the method of flowchart 200 of FIG. 2.

Exemplary UE device 500 includes a processor 502, e.g., a CPU, a wireless interface 504, a network interface 506, e.g., a wired or optical interface, an assembly of hardware components 508, e.g., an assembly of circuits, an I/O interface 509, a GPS receiver unit 510, e.g., an embedded GPS receiver circuit board or GPS chip, a memory 512, a first SIM 560, which is SIM 1, and a second SIM 562, which is SIM 2, coupled together via a bus 514 over which the various components may interchange data and information. Wireless interface 504 includes radio 1 505 and radio 2 507. Radio 1 505 corresponds to SIM 1 560; and radio 2 507 corresponds to SIM 2 562.

Radio 1 505 includes a wireless receiver 516 and a wireless transmitter 518. Wireless receiver 516 is coupled to a receive antenna 517, via which UE 500 receives wireless signals from base stations, wherein at least some of the base stations are CBSD devices, e.g., a CBSD which is part of a first network. Wireless transmitter 518 is coupled to a transmit antenna 519, via which UE 500 transmits wireless signals to base stations, wherein at least some of the base stations are CBSD devices, e.g., a CBSD which is part of a first network. In some embodiments, the same antenna is used for receive and transmit. In some embodiments, multiple antennas and/or multiple antenna elements are used for transmit and/or receive.

Radio 2 507 includes a wireless receiver 556 and a wireless transmitter 558. Wireless receiver 556 is coupled to a receive antenna 557, via which UE 500 receives wireless signals from base stations, wherein at least some of the base stations are CBSD devices, e.g., a CBSD which is part of a second network. Wireless transmitter 558 is coupled to a transmit antenna 559, via which UE 500 transmits wireless signals to base stations, wherein at least some of the base stations are CBSD devices, e.g., a CBSD which is part of a second network. In some embodiments, the same antenna is used for receive and transmit. In some embodiments, multiple antennas and/or multiple antenna elements are used for transmit and/or receive.

Network interface 506 includes a receiver 520 and a transmitter 521, via which the UE 500 can communicate with other devices, e.g., network nodes, when the UE 500 is physically connected to via a wired or optical interface, e.g. to a backhaul network or local wired network. GPS receiver unit 510 includes a GPS wireless receiver 522 coupled to GPS antenna 523 via which UE 500 receives GPS signals, computational circuitry 525, which calculates UE 500 position and velocity based on received GPS signals, and an interface 527 which formats and outputs data, e.g., GPS messages, including, e.g., time information, latitude information, longitude information, altitude information, and velocity information, to the internal bus 514 of UE 500.

UE device 500 further includes a microphone 524, a speaker 526, switches 528, a display 530, e.g., a touchscreen display serving as both an input and output device, a keypad 532, a mouse 534, and a camera 536, coupled to I/O interface 509, via which the various I/O devices (526, 524, 528, 530, 532, 534, and 536, may communicate with other components, e.g., including processor 502 and memory 512 and/or other device coupled to bus 514, within UE 500.

Memory 512 includes a control routine 538, an assembly of components 540, e.g., an assembly of software components, and data/information 542. Data/information 542 includes radio 1 frequency hopping pattern information 570, radio 1 encryption algorithm information 571 including encryption information 572 and decryption information 573, radio 2 frequency hopping pattern information 574, radio 2 encryption algorithm information 575 including encryption information 576 and decryption information 577, voice data to be sent to a second UE 578, e.g., packets of voice data to be sent to UE 2, encrypted voice data packets 579 to be communicated via radio 1, generated signals 580 conveying voice data to be transmitted via radio 1, encrypted voice data packets 581 to be communicated via radio 2, generated signals 582 conveying voice data to be transmitted via radio 2, received signals 583 conveying voice data which were received via radio 1, recovered encrypted voice data packets 584 recovered from received radio I signals, received signals 585 conveying voice data which were received via radio 2, recovered encrypted voice data packets 586 recovered from received radio 2 signals, recovered decrypted voice data packets 587 from radio 1 recovered encrypted voice data packets, recovered decrypted voice data packets 588 from radio 2 recovered encrypted voice data packets, and a recovered voice stream 589 generated from one or both of recovered decrypted voice data packets 587 and recovered decrypted voice data packets 588. Data/information 542 further includes a generated frequency hopping change request message 590, e.g. directed to a spectrum access system, and a received frequency hopping change response message 591, e.g. indicating that the requested frequency hopping change was approved.

Data/information 542 further includes first network information 592 including CBSDs information 593, e.g., CBSD location ID information and CBSD location information for CBSDs in network 1, and second network information 594 including CBSDs information 595, e.g., CBSD location ID information and CBSD location information for CBSDs in network 2.

Figure 6A:
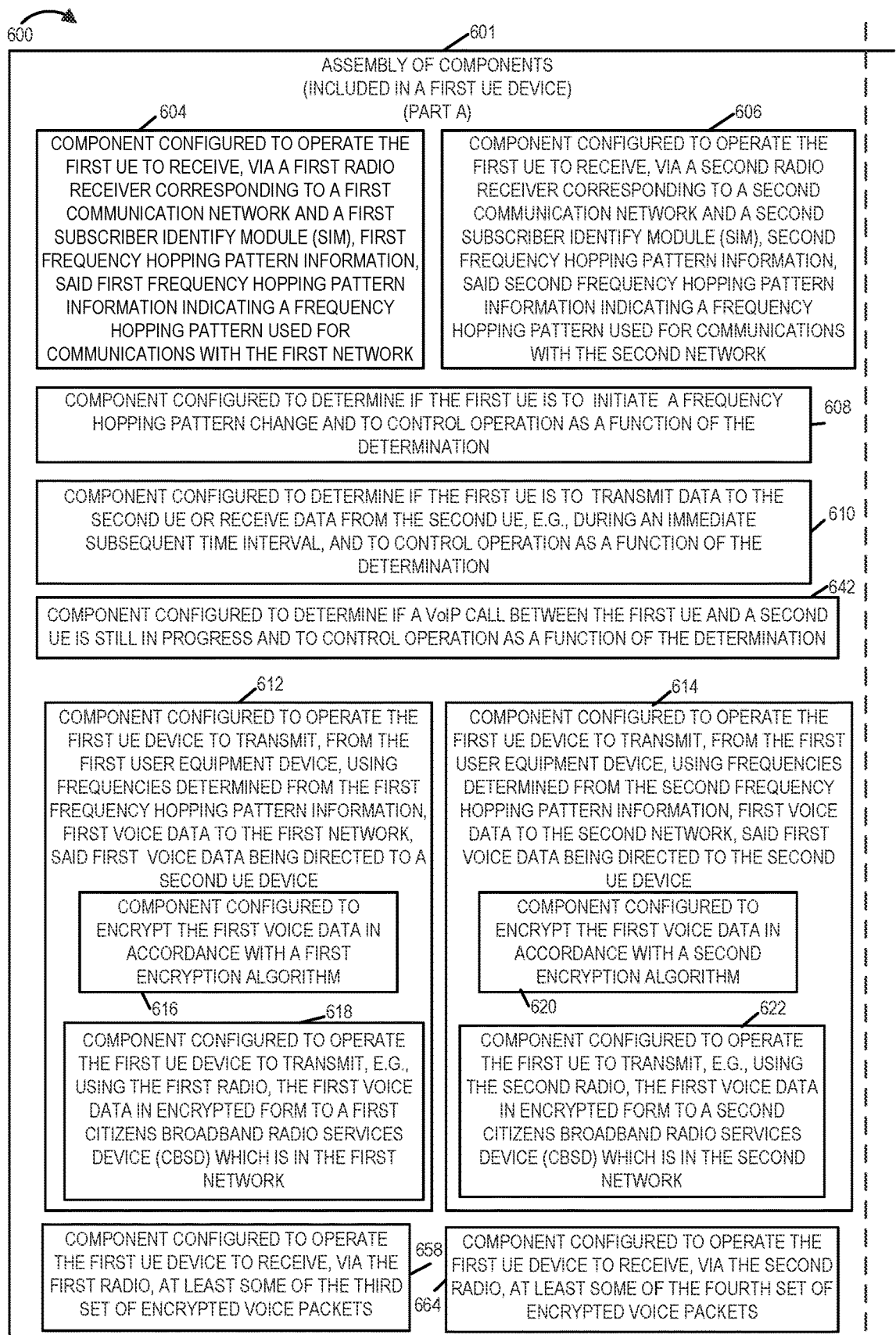
FIG. 6A is a first part of a drawing of an exemplary assembly of components which may be included in a first UE device, in accordance with an exemplary embodiment.
Figures 6, 6B:
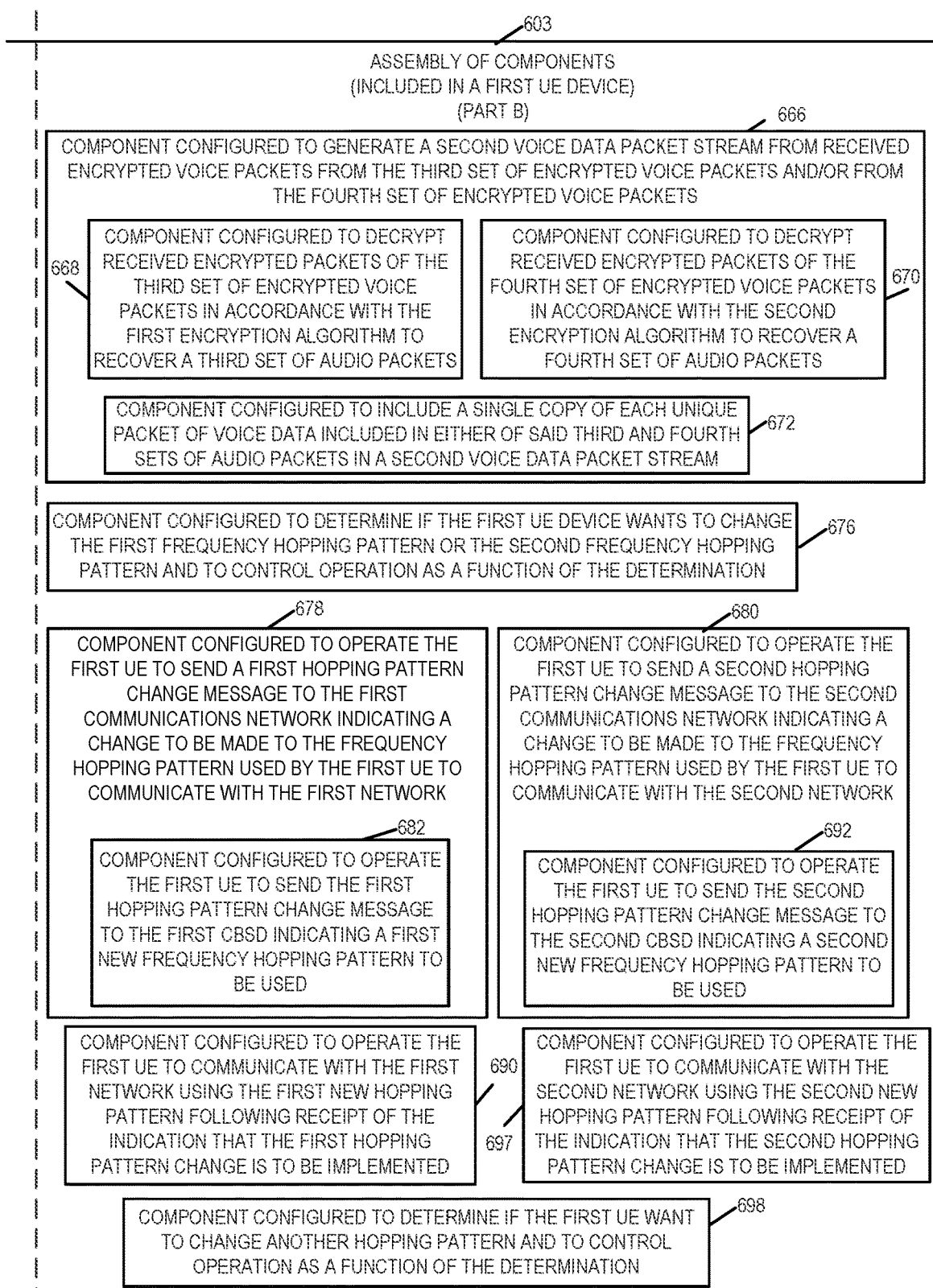
FIG. 6B is a second part of a drawing of an exemplary assembly of components which may be included in a first UE device, in accordance with an exemplary embodiment.
FIG. 6 comprises the combination of FIG. 6A and FIG. 6B.

FIG. 6 comprising, the combination of FIG. 6A and FIG. 6B, is a drawing of an exemplary assembly of components 600, comprising Part A 601 and Part B 603, which may be included in a first UE device, in accordance with an exemplary embodiment.

Exemplary assembly of components 600 is, e.g., included in UE 1 102 of FIG. 1, FIG. 3 and FIG. 4, the first UE implementing steps of flowchart 200 of FIG. 2, and/or UE 500 of FIG. 5.

The components in the assembly of components 600 can, and in some embodiments are, implemented fully in hardware within the processor 502, e.g., as individual circuits. The components in the assembly of components 600 can, and in some embodiments are, implemented fully in hardware within the assembly of components 508, e.g., as individual circuits corresponding to the different components. In other embodiments some of the components are implemented, e.g., as circuits, within the processor 502 with other components being implemented, e.g., as circuits within assembly of components 508, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 512 of the UE device 500 with the components controlling operation of the UE device to implement the functions corresponding to the components when the components are executed by a processor, e.g., processor 502. In some such embodiments, the assembly of components 600 is included in the memory 512 as assembly of components 540. In still other embodiments, various components in assembly of components 600 are implemented as a combination of hardware and software, e.g., with another circuit external to the processor 502 providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 600 is stored in the memory 512, the memory 512 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the UE device 500, or elements therein such as the processor 502, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of the method of flowchart 200 of FIG. 2 and/or described or shown with respect to any of the other figures.

Assembly of components 600 includes a component 604 configured to operate the first UE device to receive, via a first radio receiver corresponding to a first communications network and a first subscriber identity module (SIM), first frequency hopping pattern information, said first frequency hopping pattern information indicating a frequency hopping pattern used for communications with the first network, and a component 606 configured to operate the first UE device to receive, via a second radio receiver corresponding to a second communications network and a second subscriber identity module (SIM), second frequency hopping pattern information, said second frequency hopping pattern information indicating a frequency hopping pattern used for communications with the second network.

Assembly of components 600 further includes a component 608 configured to determine if the first UE device is to initiate a frequency hopping pattern change and to control operation as a function of the determination, a component 610 configured to determine if the first UE device is to transmit data to the second UE device or receive data from the second UE device, e.g., during an immediate subsequent time interval, and to control operation as a function of the determination, and a component 642 configured to determine if a VoIP call between the first UE device and a second UE device is still in progress and to control operation as a function of the determination.

Assembly of components 600 further includes a component 612 configured to operate the first UE device to transmit, e.g., via the first radio, from the first UE device, using frequencies determined from the first frequency hopping pattern information, first voice data to the first network, said first voice data being directed to a second UE device. Component 612 includes a component 616 configured to encrypt the first voice data in accordance with a first encryption algorithm and a component 618 configured to operate the first UE device to transmit, e.g. using the first radio, the first voice data in encrypted from to a first citizens broadband radio services device (CBSD) which is in the first network.

Assembly of components 600 further includes a component 614 configured to operate the first UE device to transmit, e.g., via the second radio, from the first UE device, using frequencies determined from the second frequency hopping pattern information, first voice data to the second network, said first voice data being directed to the second UE device. Component 614 includes a component 620 configured to encrypt the first voice data in accordance with a second encryption algorithm and a component 622 configured to operate the first UE device to transmit, e.g. using the second radio, the first voice data in encrypted from to a second citizens broadband radio services device (CBSD) which is in the second network.

Assembly of components 600 further includes a component 658 configured to operate the first UE device to receive, via the first radio, at least some of a third set of encrypted voice packets, a component 664 configured to operate the first UE device to receive, via the second radio, at least some of a fourth set of encrypted voice packets, and a component 666 configured to generate a second voice data packet stream form received encrypted voice packets from the third set of encrypted voice packets and/or from the fourth set of encrypted voice packets. Component 666 includes a component 668 configured to decrypt received encrypted packets of the third set of encrypted voice packets in accordance with the first encryption algorithm, e.g., using decryption information in accordance with first encryption algorithm, to recover a third set of audio packets, a component 670 configured to decrypt received encrypted packets of the fourth set of encrypted voice packets in accordance with the second encryption algorithm, e.g., using decryption information in accordance with second encryption algorithm, to recover a fourth set of audio packets, and a component configured to include a single copy of each unique packet of voice data included in either of said third and fourth sets of audio packets in a second voice data packet stream.

Assembly of components 600 further includes a component 678 configured to operate the first UE to send a first hopping pattern change message to the first communications network indicating a change to made to the frequency hopping pattern used by the first UE device to communicate with the first network. Component 678 includes a component 682 configured to operate the first UE to send the first hopping pattern change message to the first CBSD indicating a first new frequency hopping pattern to be used. Assembly of components 600 further includes a component 680 configured to operate the first UE to send a second hopping pattern change message to the second communications network indicating a change to made to the frequency hopping pattern used by the first UE device to communicate with the second network. Component 680 includes a component 692 configured to operate the first UE to send the second hopping pattern change message to the second CBSD indicating a second new frequency hopping pattern to be used.

Assembly of components 600 further includes a component 690 configured to operate the first UE device to communicate with the first network using the first new frequency hopping pattern following receipt of the indication that the first hopping pattern change is to be implemented, a component 697 configured to operate the first UE device to communicate with the second network using the second new hopping pattern following receipt of the indication that the second hopping pattern change is to be implemented, and a component 698 configured to determine if the first UE device wants to change another hopping pattern to control operation as a function of the determination.

Figure 7:
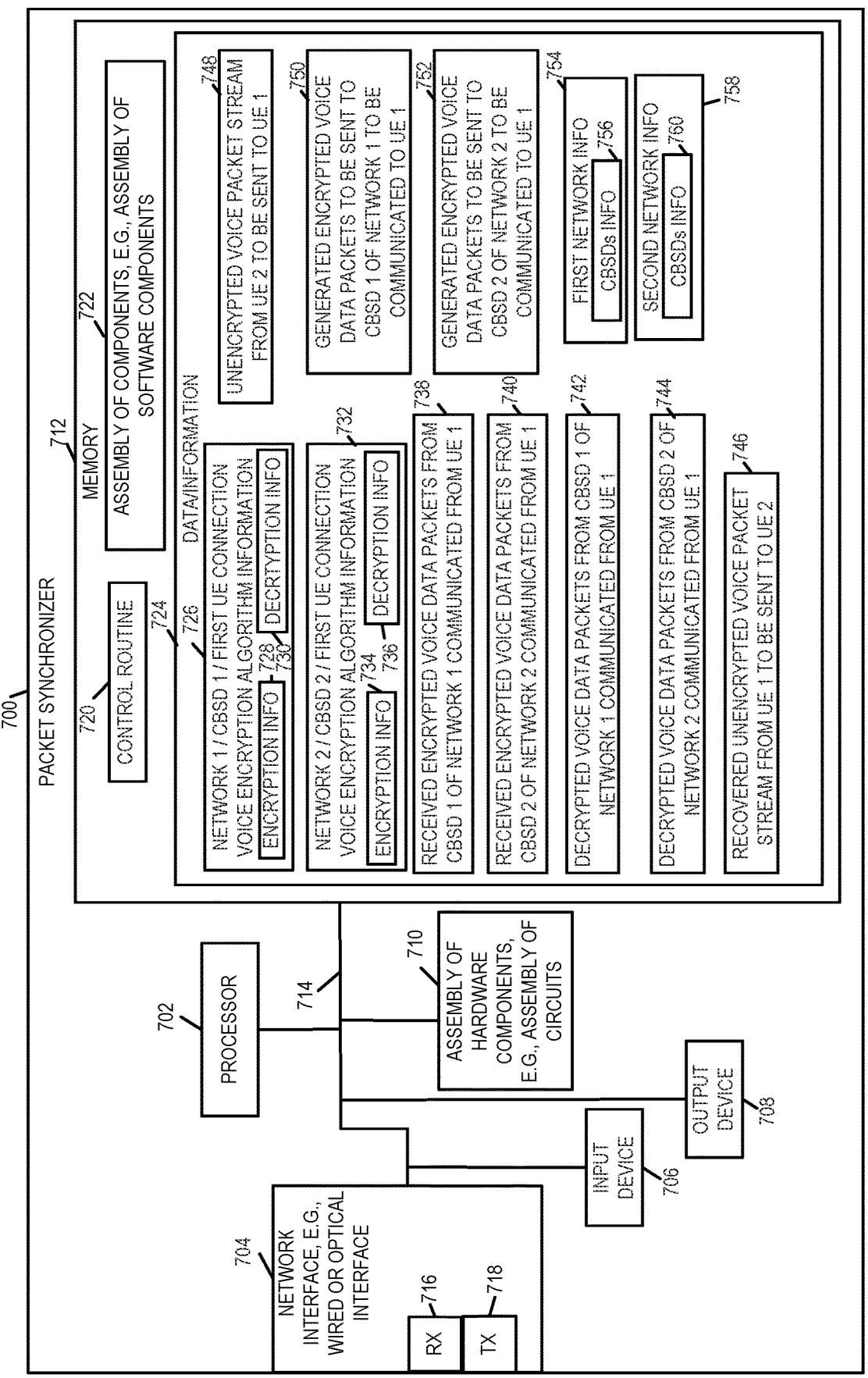
FIG. 7 is a drawing of an exemplary packet synchronizer in accordance with an exemplary embodiment.

FIG. 7 is a drawing of an exemplary packet synchronizer 700 in accordance with an exemplary embodiment. Packet synchronizer 700 is, e.g., VoIP packet synchronizer 118 of FIG. 1, FIG. 3 and FIG. 4 and/or a packet synchronizer implementing steps of the method 200 of FIG. 2. Packet synchronizer 700 includes a processor 702, e.g., a CPU, a network interface 704, e.g., a wired or optical interface, an input device 706, e.g., a keyboard, an output device 708, e.g., a display, an assembly of hardware components 710, e.g., an assembly of circuits, and memory 712 coupled together via a bus 714 over which the various elements interchange data and information.

Network interface 704 includes a receiver 716 and a transmitter 718. Memory 712 includes a control routine 720, an assembly of components 722, e.g., an assembly of software components, and data/information 724. Data/information 724 includes network 1/CBSD 1/first UE (UE 1) connection voice encryption algorithm information 726 include encryption information 728 and decryption information 730, network 2/CBSD 2/first UE (UE 1) connection voice encryption algorithm information 732 include encryption information 734 and decryption information 736, received encrypted voice data packets 738 from CBSD 1 of network 1 communicated from UE 1, conveying voice information to be communicated to a second UE (UE 2), received encrypted voice data packets 740 from CBSD 2 of network 2 communicated from UE 1, conveying voice information to be communicated to the second UE (UE 2), decrypted voice data packets 742 recovered from received encrypted voice data packets from CBSD 1 of network 1, with the communicated voice information sourced from UE 1 and intended for destination device UE 2, decrypted voice data packets 744 recovered from the received encrypted voice data packets from CBSD 2 of network 2, with the communicated voice information sourced from UE 1 and intended for destination device UE 2, and a recovered unencrypted voice packet stream 746, of voice information sourced from UE 1 to be sent to destination UE, with the unencrypted voice packet stream 746 being generated from decrypted voice data packets 742 and/or decrypted voice data packets 744, with redundant packets being discarded, e.g., only keep one copy in the combined packet streams of each unique packet, and the original intended packet order being re-established.

Data/information 724 further includes an unencrypted voice packet stream 748 from the second UE, e.g. UE 2, to be sent to the first UE, e.g. UE 1, generated encrypted voice data packets 750 to be sent to the CBSD 1 of network 1 to be communicated to the first UE, e.g., UE 1, generated encrypted voice data packets 752 to be sent to the CBSD 2 of network 2 to be communicated to the first UE, e.g., UE 1, first network information 754 including CBSD information 756 for the CBSDs in network 1, and second network information 758 including CBSDs information 760 for the CBSDs in network 2.

Figure 8:
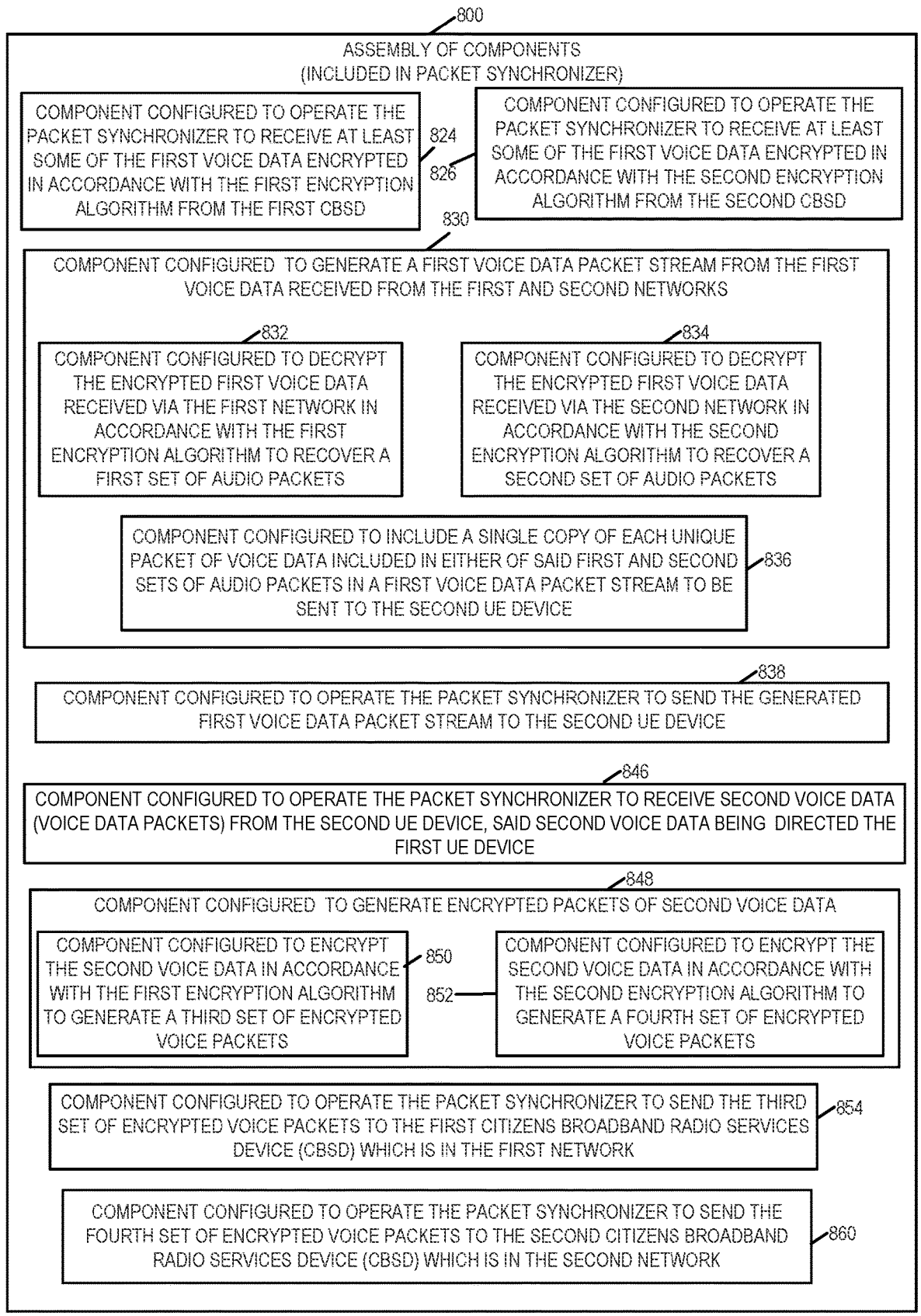
FIG. 8 is a drawing of an exemplary assembly of components which may be included in a packet synchronizer in accordance with an exemplary embodiment.

FIG. 8 is a drawing of an exemplary assembly of components 800 which may be included in a packet synchronizer in accordance with an exemplary embodiment. Exemplary assembly of components 800 is, e.g., included in VoIP packet synchronizer 118 of FIG. 1, FIG. 3 and FIG. 4, a packet synchronizer implementing steps of flowchart 200 of FIG. 2, and/or packet synchronizer 700 of FIG. 7.

The components in the assembly of components 800 can, and in some embodiments are, implemented fully in hardware within the processor 702, e.g., as individual circuits. The components in the assembly of components 800 can, and in some embodiments are, implemented fully in hardware within the assembly of components 710, e.g., as individual circuits corresponding to the different components. In other embodiments some of the components are implemented, e.g., as circuits, within the processor 702 with other components being implemented, e.g., as circuits within assembly of components 710, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the packet synchronizer 700 with the components controlling operation of the packet synchronizer to implement the functions corresponding to the components when the components are executed by a processor, e.g., processor 702. In some such embodiments, the assembly of components 800 is included in the memory 712 as assembly of components 722. In still other embodiments, various components in assembly of components 800 are implemented as a combination of hardware and software, e.g., with another circuit external to the processor 702 providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 800 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the packet synchronizer 700, or elements therein such as the processor 702, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of flowchart 200 of FIG. 2 and/or described or shown with respect to any of the other figures.

Assembly of components 800 includes a component 824 configured to operate the packet synchronizer to receive at least some of the first voice data in encrypted in accordance with the first encryption algorithm from the first CBSD, a component 826 configured to operate the packet synchronizer to receive at least some of the first voice data in encrypted in accordance with the second encryption algorithm from the second CBSD, and a component 830 configured to generate a first voice data packet stream from the first voice data received from the first and second networks. Component 830 includes a component 832 configured to decrypt the encrypted first voice data received via the first network in accordance with the first encryption algorithm, e.g., using decryption information in accordance with the first encryption algorithm, to recover a first set of audio packets, and a component 834 configured to decrypt the encrypted first voice data received via the second network in accordance with the second encryption algorithm, e.g., using decryption information in accordance with the second encryption algorithm, to recover a second set of audio packets, and a component 836 configured to include a single copy of each unique packet of voice data included in wither of said first and second sets of audio packets in a first voice data packet stream to be sent to the second UE device.

Assembly of components 800 further includes a component 838 configured to operate the packet synchronizer to send the generated first voice data packet stream to the second UE device, a component 846 configured to operate the packet synchronizer to receive second voice data (voice data packets) from the second UE device, said second voice data packets being directed to the first UE device, and a component 848 configured to generated decrypted packets of second voice data. Component 848 includes a component 850 configured to encrypt the second voice data in accordance with the first encryption algorithm to generate a third set of encrypted voice packets and a component 852 configured to encrypt the second voice data in accordance with second encryption algorithm to generate a fourth set of encrypted voice packets.

Assembly of components 800 further includes a component 854 configured to operate the packet synchronizer to send the third set of encrypted voice packets to the first citizens broadband radio services device (CBSD) which is in the first network and a component 860 configured to operate the packet synchronizer to send the fourth set of encrypted voice packets to the second citizens broadband radio services device (CBSD) which is in the second network.

Figure 9:
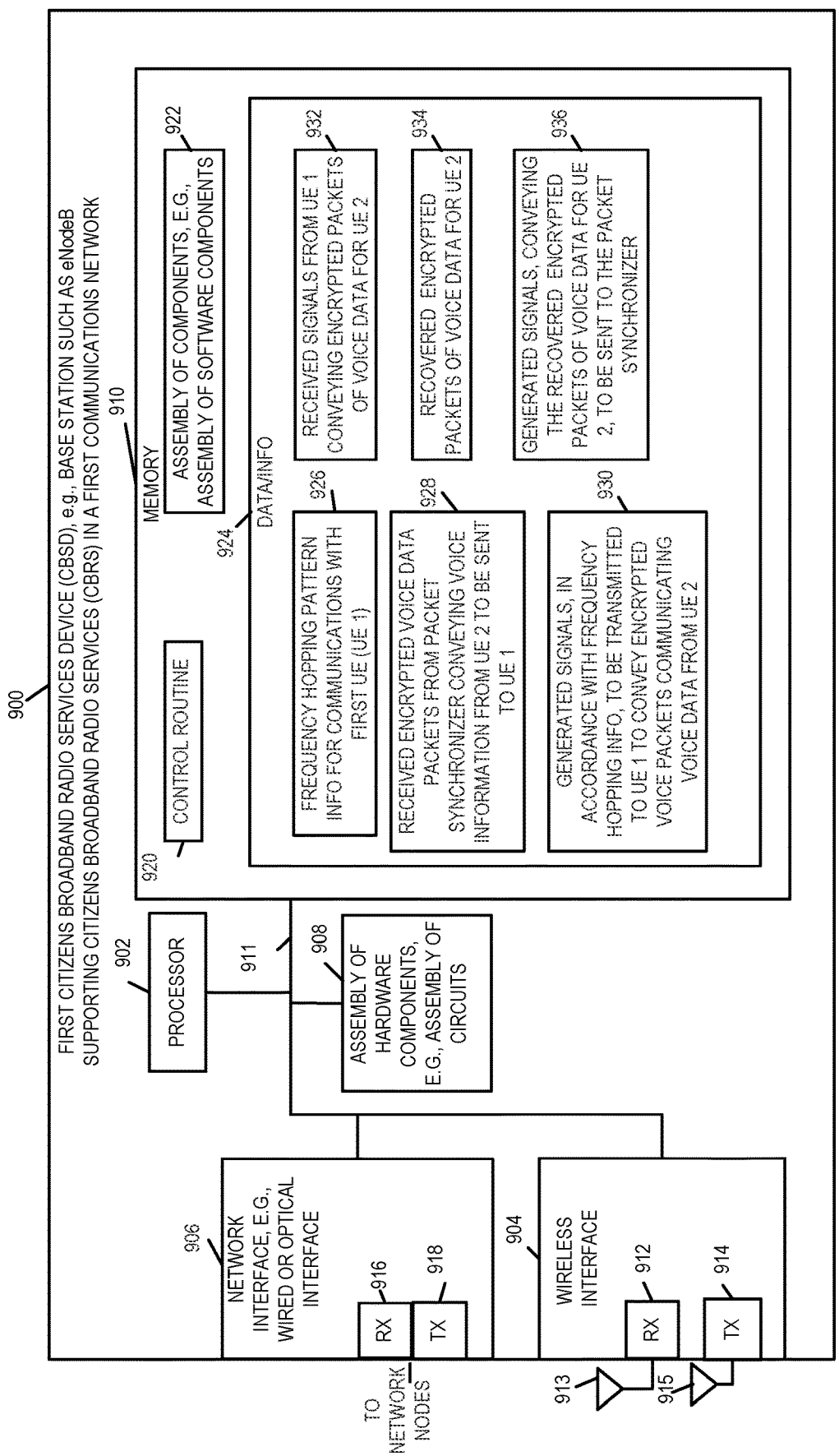
FIG. 9 is a drawing of an exemplary first citizens broadband radio services device (CBSD) in accordance with an exemplary embodiment.

FIG. 9 is a drawing of an exemplary first Citizens Broadband radio Services Device (CBSD) 900 in accordance with an exemplary embodiment, e.g., a base station such an eNodeB (eNB) supporting Citizens Broadband Radio Services (CBRS), in accordance with an exemplary embodiment. First CBSD 900 is, e.g., CBSD 1 104 of FIG. 1, FIG. 3 and FIG. 4, a first CBSD implementing steps in flowchart 200 of FIG. 2, and/or first CBSD 900 of FIG. 9. CBSD 900 includes a processor 902, e.g., a CPU, a wireless interface 904, a network interface 906, an assembly of hardware components 908, e.g., an assembly of circuits, and a memory 910 coupled together via bus 911 over which the various elements interchange data and information with one another. Wireless interface 904 includes a wireless receiver 912 and a wireless transmitter 914. Wireless receiver 912 is coupled to receive antenna 913 via which the CBSD 900 receives wireless signals, e.g., CBRS wireless signals from UEs supporting CBRS communications. Wireless transmitter 914 is coupled to transmit antenna 915 via which the CBSD 900 transmits wireless signals, e.g., CBRS wireless signals to UEs supporting CBRS communications.

Network interface 906 includes a network receiver 916 and a network transmitter 918 coupled to network nodes, a backhaul network and/or the Internet. Memory 910 includes a control routine 920, an assembly of components 922, e.g., an assembly of software components, and data/information 924. Data/information 924 includes frequency hopping pattern information 926 for communications with first UE (UE1), received encrypted voice data packets 928 from a packet synchronizer conveying voice information from UE 2 for UE 1, generated signals 930, in accordance with the frequency hopping information, to be transmitted to UE 1 to convey encrypted voice data from UE 2, received signals 932 from UE 1 conveying encrypted packets of voice data for UE 2, recovered encrypted packets 934 of voice data for UE 2, and generated signals 936, conveying the recovered encrypted packets of voice data for UE 2, to be sent to the packet synchronizer.

Figure 10:
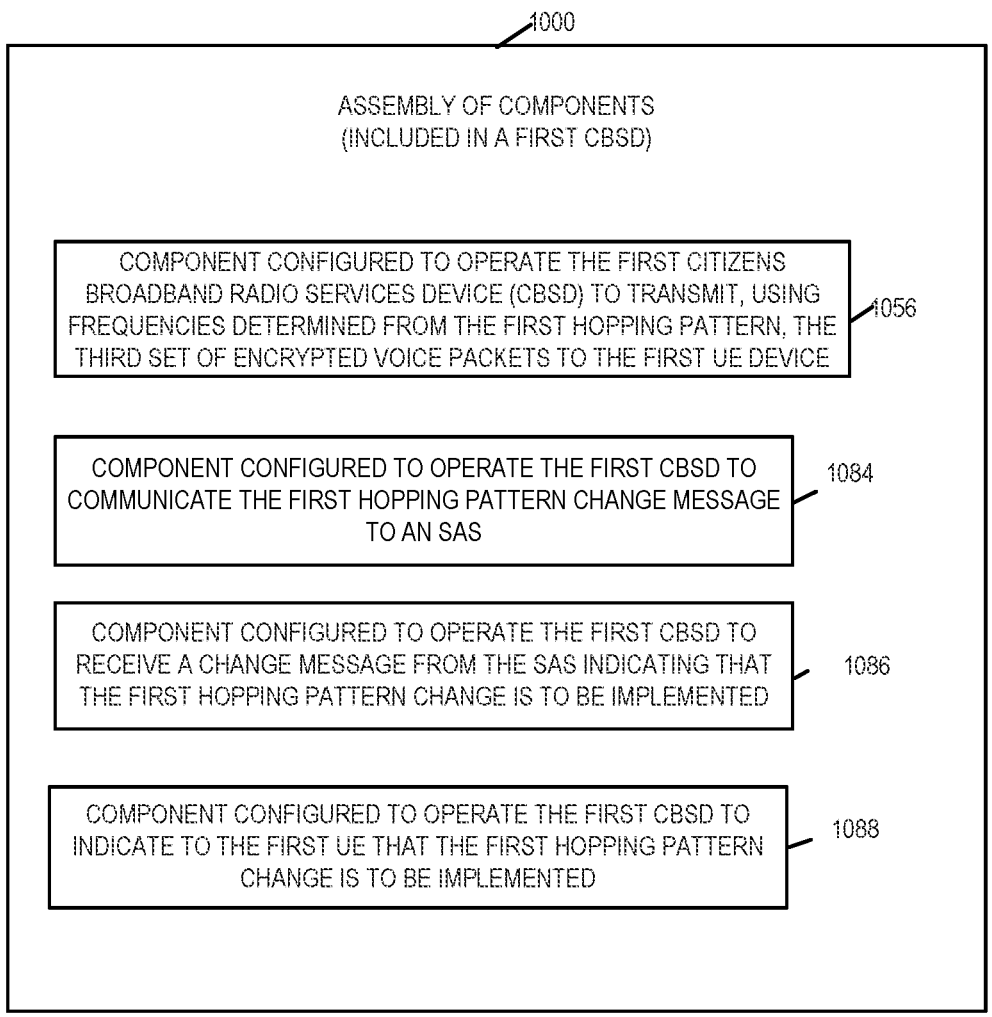
FIG. 10 is a drawing of an exemplary assembly of components which may be included in an exemplary first citizens broadband radio services device (CBSD) in accordance with an exemplary embodiment.

FIG. 10 is a drawing of an exemplary assembly of components 1000 which may be included in an exemplary first Citizens Broadband radio Services Device (CBSD) in accordance with an exemplary embodiment. Exemplary assembly of components 1000 is, e.g., included in CBSD 1 104 of FIG. 1, FIG. 3 and FIG. 4, a first CBSD implementing steps of flowchart 200 of FIG. 2, and/or first CBSD 900 of FIG. 9.

The components in the assembly of components 1000 can, and in some embodiments are, implemented fully in hardware within the processor 902, e.g., as individual circuits. The components in the assembly of components 1000 can, and in some embodiments are, implemented fully in hardware within the assembly of components 908, e.g., as individual circuits corresponding to the different components. In other embodiments some of the components are implemented, e.g., as circuits, within the processor 902 with other components being implemented, e.g., as circuits within assembly of components 908, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 912 of the first CBSD 900 with the components controlling operation of the first CBSD to implement the functions corresponding to the components when the components are executed by a processor, e.g., processor 902. In some such embodiments, the assembly of components 1000 is included in the memory 910 as assembly of components 922. In still other embodiments, various components in assembly of components 1000 are implemented as a combination of hardware and software, e.g., with another circuit external to the processor 902 providing input to the processor 902 which then under software control operates to perform a portion of a component's function. While processor 902 is shown in the FIG. 9 embodiment as a single processor, e.g., computer, it should be appreciated that the processor 902 may be implemented as one or more processors, e.g., computers.

When implemented in software the components include code, which when executed by the processor 902, configure the processor 902 to implement the function corresponding to the component. In embodiments where the assembly of components 1000 is stored in the memory 910, the memory 910 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the first CBSD 900, or elements therein such as the processor 902, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method, e.g., steps of the method of flowchart 200 of FIG. 2 and/or described or shown with respect to any of the other figures.

Figure 11:
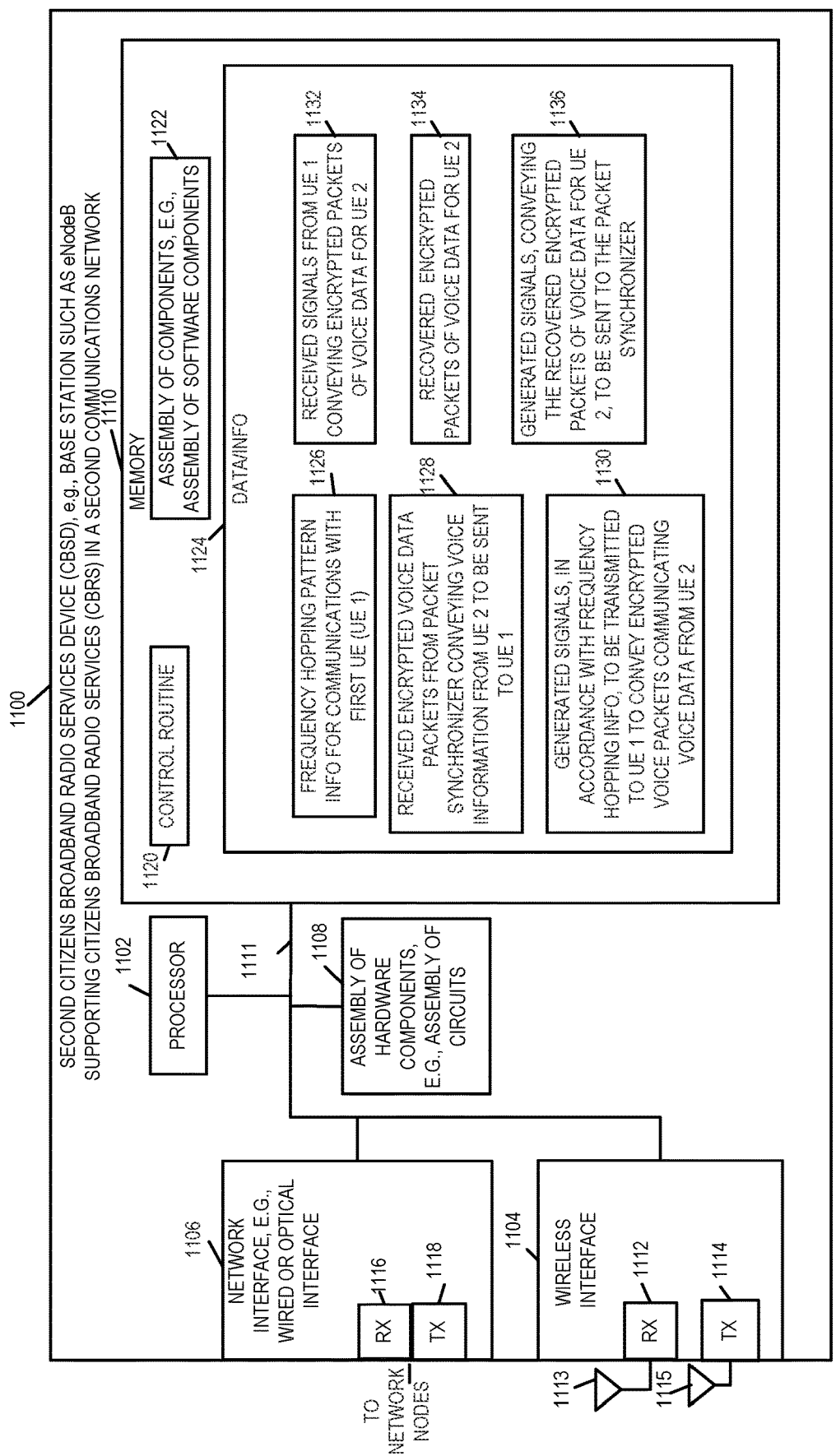
FIG. 11 is a drawing of an exemplary second citizens broadband radio services device (CBSD) in accordance with an exemplary embodiment.

Assembly of components 1000 includes a component 1056 configured to operate the first CBSD to transmit, using frequencies determined from the first hopping pattern, the third set of encrypted voice packets to the first UE device, a component 1884 configured to operate the first CBSD to communicate the first hopping pattern change message to a SAS, a component 1086 configured to operate the first CBSD to receive a change message from the SAS indicating that the first hopping pattern change is to implemented, and a component 1088 configured to operate the first CBSD to indicate to the first UE device that the first hopping pattern change is to be FIG. 11 is a drawing of an exemplary second Citizens Broadband radio Services Device (CBSD) 1100 in accordance with an exemplary embodiment. Second CBSD 1100 is, e.g., CBSD 2 106 of FIG. 1, FIG. 3 and FIG. 4, a second CBSD implementing steps in flowchart 200 of FIG. 2, and/or second CBSD 1100 of FIG. 11. CBSD 1100 includes a processor 1102, e.g., a CPU, a wireless interface 1104, a network interface 1106, an assembly of hardware components 1108, e.g., an assembly of circuits, and a memory 1110 coupled together via bus 1111 over which the various elements interchange data and information with one another. Wireless interface 1104 includes a wireless receiver 1112 and a wireless transmitter 1114. Wireless receiver 1112 is coupled to receive antenna 1113 via which the CBSD 1100 receives wireless signals, e.g., CBRS wireless signals from UEs supporting CBRS communications. Wireless transmitter 1114 is coupled to transmit antenna 1115 via which the CBSD 1100 transmits wireless signals, e.g., CBRS wireless signals to UEs supporting CBRS communications.

Network interface 1106 includes a network receiver 1116 and a network transmitter 1118 coupled to network nodes, a backhaul network and/or the Internet. Memory 1110 includes a control routine 1120, an assembly of components 1122, e.g., an assembly of software components, and data/information 1124. Data/information 1124 includes frequency hopping pattern information 1126 for communications with first UE (UE1), received encrypted voice data packets 1128 from a packet synchronizer conveying voice information from UE 2 for UE 1, generated signals 1130, in accordance with the frequency hopping information, to be transmitted to UE 1 to convey encrypted voice data from UE 2, received signals 1132 from UE 1 conveying encrypted packets of voice data for UE 2, recovered encrypted packets 1134 of voice data for UE 2, and generated signals 1136, conveying the recovered encrypted packets of voice data for UE 2, to be sent to the packet synchronizer.

Figure 12:
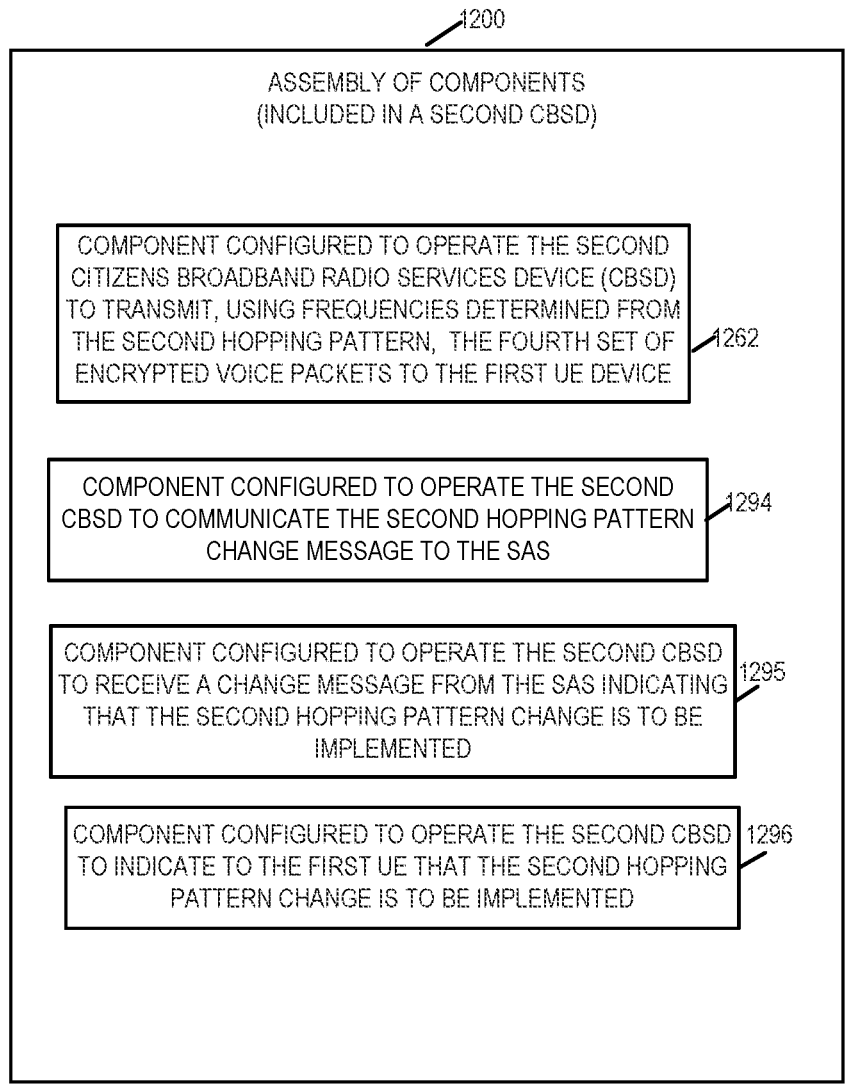
FIG. 12 is a drawing of an exemplary assembly of components which may be included in an exemplary second citizens broadband radio services device (CBSD) in accordance with an exemplary embodiment.

FIG. 12 is a drawing of an exemplary assembly of components 1200 which may be included in an exemplary second Citizens Broadband radio Services Device (CBSD) in accordance with an exemplary embodiment. Exemplary assembly of components 1200 is, e.g., included in CBSD 2 106 of FIG. 1, FIG. 3 and FIG. 4, a second CBSD implementing steps of flowchart 200 of FIG. 2, and/or second CBSD 1100 of FIG. 11.

The components in the assembly of components 1200 can, and in some embodiments are, implemented fully in hardware within the processor 1102, e.g., as individual circuits. The components in the assembly of components 1200 can, and in some embodiments are, implemented fully in hardware within the assembly of components 1108, e.g., as individual circuits corresponding to the different components. In other embodiments some of the components are implemented, e.g., as circuits, within the processor 1102 with other components being implemented, e.g., as circuits within assembly of components 1108, external to and coupled to the processor 1102. As should be appreciated the level of integration of components on the processor and/or with some components being external to the processor may be one of design choice. Alternatively, rather than being implemented as circuits, all or some of the components may be implemented in software and stored in the memory 1112 of the second CBSD 1100 with the components controlling operation of the second CBSD to implement the functions corresponding to the components when the components are executed by a processor, e.g., processor 1102. In some such embodiments, the assembly of components 1200 is included in the memory 1110 as assembly of components 1122. In still other embodiments, various components in assembly of components 1200 are implemented as a combination of hardware and software, e.g., with another circuit external to the processor 1102 providing input to the processor 1102 which then under software control operates to perform a portion of a component's function. While processor 1102 is shown in the FIG. 11 embodiment as a single processor, e.g., computer, it should be appreciated that the processor 1102 may be implemented as one or more processors, e.g., computers.

When implemented in software the components include code, which when executed by the processor 1102, configure the processor 1102 to implement the function corresponding to the component. In embodiments where the assembly of components 1200 is stored in the memory 1110, the memory 1110 is a computer program product comprising a computer readable medium comprising code, e.g., individual code for each component, for causing at least one computer, e.g., processor 1102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the second CBSD 1100, or elements therein such as the processor 1102, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of the method of flowchart 200 of FIG. 2 and/or described or shown with respect to any of the other figures.

Assembly of components 1200 includes a component 1262 configured to operate the second CBSD to transmit, using frequencies determined from the second hopping pattern, the fourth set of encrypted voice packets to the first UE device, a component 1294 configured to operate the second CBSD to communicate the second hopping pattern change message to a SAS, a component 1295 configured to operate the second CBSD to receive a change message from the SAS indicating that the second hopping pattern change is to implemented, and a component 1296 configured to operate the second CBSD to indicate to the first UE device that the second hopping pattern change is to be implemented.

Figure 13:
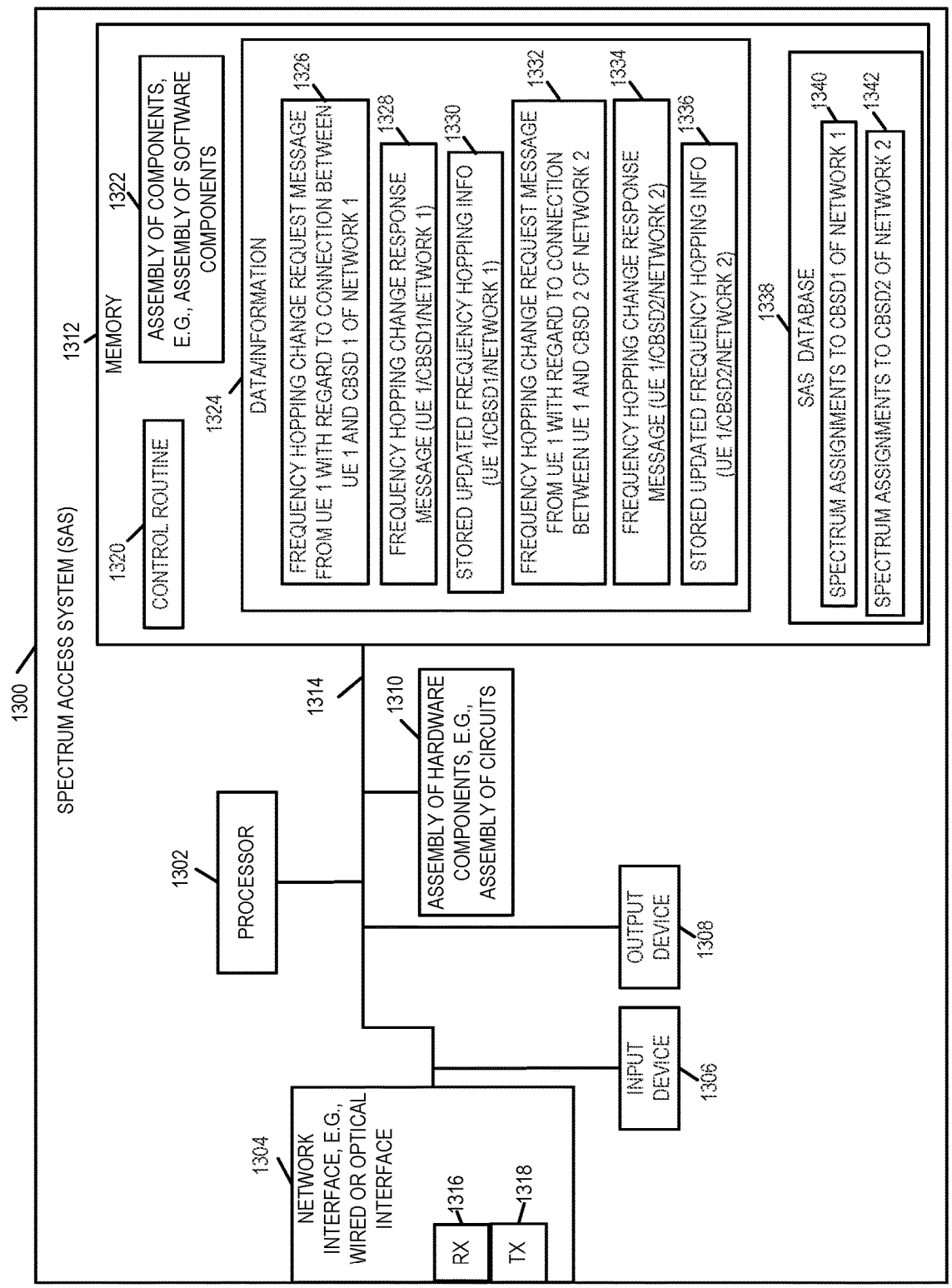
FIG. 13 is a drawing of an exemplary spectrum access system (SAS) in accordance with an exemplary embodiment.

FIG. 13 is a drawing of an exemplary Spectrum Access System (SAS) 1300 in accordance with an exemplary embodiment. SAS 1300 is, e.g., SAS 124 of FIGS. 1, 3, and 4. SAS 1300 includes a processor 1302, e.g., a CPU, a network interface 1304, e.g., a wired or optical interface, an input device 1306, e.g., a keyboard, an output device 1308, e.g., a display, an assembly of hardware components 1310, e.g., an assembly of circuits, and memory 1312 coupled together via a bus 1314 over which the various elements interchange data and information.

Network interface 1304 includes a receiver 1316 and a transmitter 1318, via which the SAS 1300 can communicate, with other communications devices, e.g., CBSDs, packet synchronizer, etc. Memory 1312 includes a control routine 1320, an assembly of components 1322, e.g., an assembly of software components, data/information 1324, and a SAS database 1326. In some embodiments, SAS database 1226 is SAS database 126 of FIG. 1. In some embodiments, the SAS database 1338 is located external to SAS 1300, e.g., a SAS server, and is coupled to the SAS server.

Data/information 1324 includes a received frequency hopping change request message 1326 from UE 1 with regard to the connection between UE 1 and CBSD 1 of network 1, a generated frequency hopping change response message 1328 to be sent to UE 1 in response to received request message 1326, e.g., indicating the SAS accepts the requested frequency hopping change request, and in some embodiments, including information indicating when the change will take effect, and stored updated frequency hopping information 1330 corresponding to the UE 1/CBSD 1/network 1 connection.

Data/information 1324 further includes a received frequency hopping change request message 1332 from UE 1 with regard to the connection between UE 1 and CBSD 2 of network 2, a generated frequency hopping change response message 1334 to be sent to UE 1 in response to received request message 1332, e.g., indicating the SAS accepts the requested frequency hopping change request, and in some embodiments, including information indicating when the change will take effect, and stored updated frequency hopping information 1336 corresponding to the UE 1/CBSD 2/network 2 connection.

SAS database 1338 includes spectrum assignments 1340 to CBSD 1 of network 1 and spectrum assignments 1342 to CBSD 2 of network 2.

Figure 14:
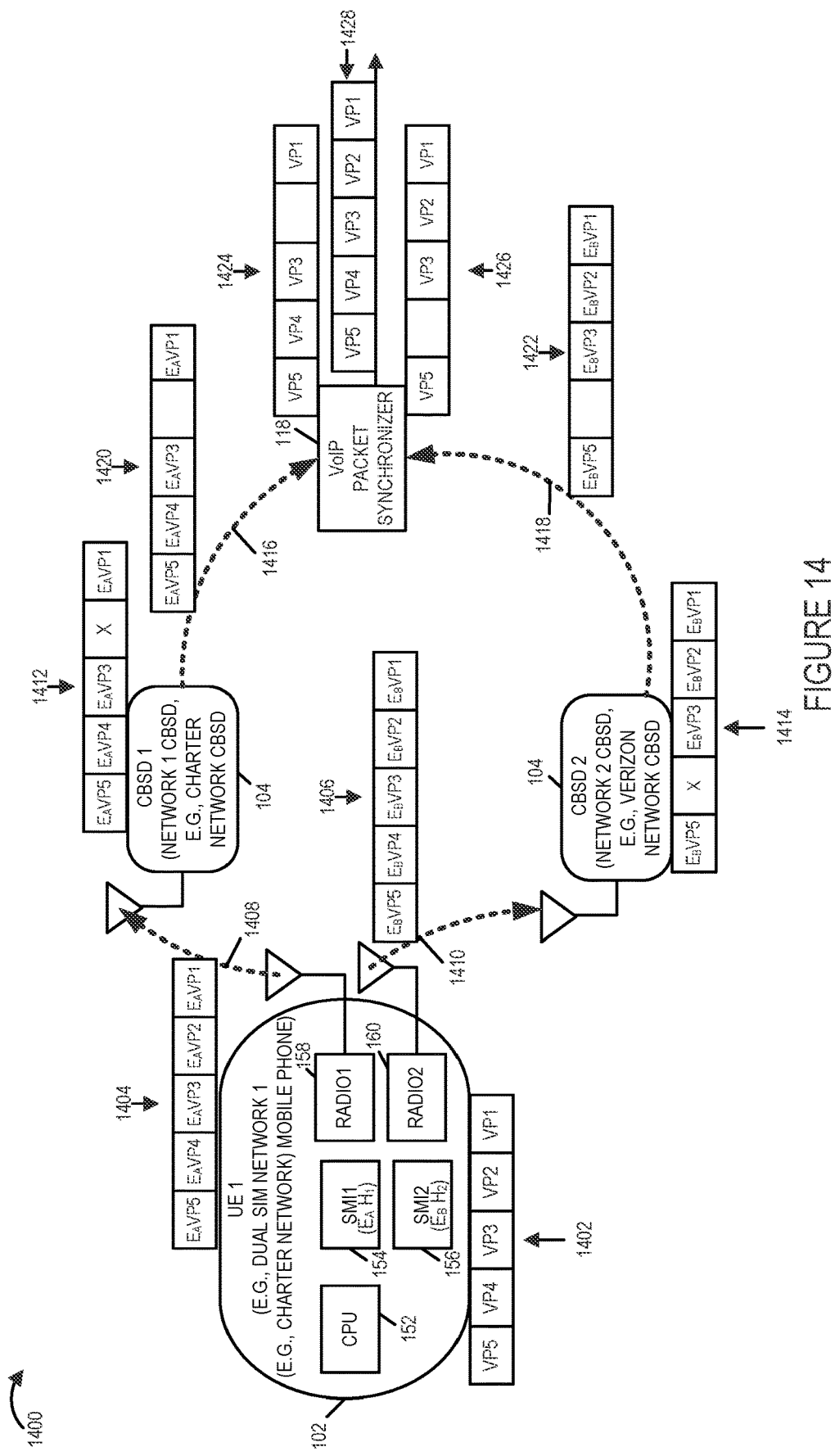
FIG. 14 is a drawing illustrating an example in which a dual SIM UE transmits voice data redundantly, via encrypted voice data packets to two different CBSDs of two different networks, and some of the transmitted encrypted data packets are not successfully communicated, however, the full voice data stream is recovered by the packet synchronizer, in accordance with an exemplary embodiment.

FIG. 14 is a drawing 1400 illustrating an example in which an exemplary dual SIM UE 102 transmits voice data redundantly, via encrypted voice data packets to two different CBSDs (CBSD 1 104, CBSD 2 106) of two different networks (network 1, network 2), respectively, and some of the transmitted encrypted data packets are not successfully communicated, however, the full voice data stream is recovered by the packet synchronizer 118, in accordance with an exemplary embodiment. The devices (dual SIM UE 1 102, CBSD 1 104 of network 1, CBSD 2 106 of network 2, and VoIP packet synchronizer 118) shown in FIG. 14 are shown and previously described with respect to FIGS. 1, 3 and 4.

User equipment device, UE 1 102, has a voice data stream 1402 including packets VP1, VP2, VP3, VP4, VP5, which are to be sent to a second UE device, e.g., as part of a VoIP call. SIM 1 154, corresponding to radio 1 158, includes information identifying that the encryption algorithm A is used for encrypting voice data sent from UE 1 102 via radio 1 158 to CBSD 1 104 of network 1 and that frequency hopping pattern H1 is to be used for the communications via radio 1 158 with CBSD 1 104. SIM 2 156, corresponding to radio 2 160, includes information identifying that the encryption algorithm B is used for encrypting voice data sent from UE 1 102 via radio 2 160 to CBSD 2 106 of network 2 and that frequency hopping pattern H2 is to be used for the communications via radio 2 160 with CBSD 2 106.

From unencrypted voice data stream packets (VP1, VP2, VP3, VP4, VP5) 1402, UE 1 102 generates, using encryption algorithm A, encrypted voice data packets (EAVP1, EAVP2, EAVP3, EAVP4, EAVP5) 1404, and using frequency hopping pattern H1 information, UE 1 102 generates signals 1408 conveying the encrypted voice data packets (EAVP1, EAVP2, EAVP3, EAVP4, EAVP5) 1404. Generated signal 1408 is transmitted via the transmitter in radio 1 158 directed to CBSD 1 104 of network 1. In this example, encrypted packets EAVP1, EAVP3, EAVP4, and EAVP5 are successfully recovered by CBSD1 104, but encrypted packet EAVP2 is not successfully recovered, as indicated by blocks 1412. e.g., do to noise or interference on the channel between UE 1 102 and CBSD 1 104.

Similarly, from unencrypted voice data stream packets (VP1, VP2, VP3, VP4, VP5) 1402, UE 1 102 generates, using encryption algorithm B, encrypted voice data packets (EBVP1, EBVP2, EBVP3, EBVP4, EBVP5) 1406, and using frequency hopping pattern H2 information, UE 1 102 generates signals 1410 conveying the encrypted voice data packets (EBVP1, EBVP2, EBVP3, EBVP4, EBVP5) 1406. Generated signal 1410 is transmitted via the transmitter in radio 2 160 directed to CBSD 2 106 of network 2. In this example, encrypted packets EBVP1, EBVP2, EBVP3, and EBVP5) are successfully recovered by CBSD 2 106, but encrypted packet EAVP4 is not successfully recovered, as indicated by blocks 1414, e.g., do to noise or interference on the channel between UE 1 102 and CBSD 2 106.

CBSD 1 104 generates and sends signal 1416 to VoIP packet synchronizer conveying the successfully recovered encrypted packets (EAVP1, EAVP3, EAVP4, and EAVP5) as indicated by blocks 1420, to VoIP packet synchronizer 118, which receives the packets and performs decryption, to recover unencrypted packets (VP1, VP3, VP4, and VP5) as indicated by blocks 1424.

CBSD 2 106 generates and sends signal 1418 to VoIP packet synchronizer 118 conveying the successfully recovered encrypted packets (EBVP1, EBVP2, EBVP3, and EBVP5) as indicated by blocks 1422, to VoIP packet synchronizer 118, which receives the packets and performs decryption, to recover unencrypted packets (VP1, VP2, VP3, and VP5) as indicated by blocks 1426. VOIP packet synchronizer 118 combines the two sets of successfully recovered decrypted packets (1424, 1426) to generate a single unencrypted voice packet stream (VP1, VP2, VP3, VP4, VP5) 1428, which is to be sent to the second user device, e.g., UE 2 114 of FIG. 1.

Figure 15:
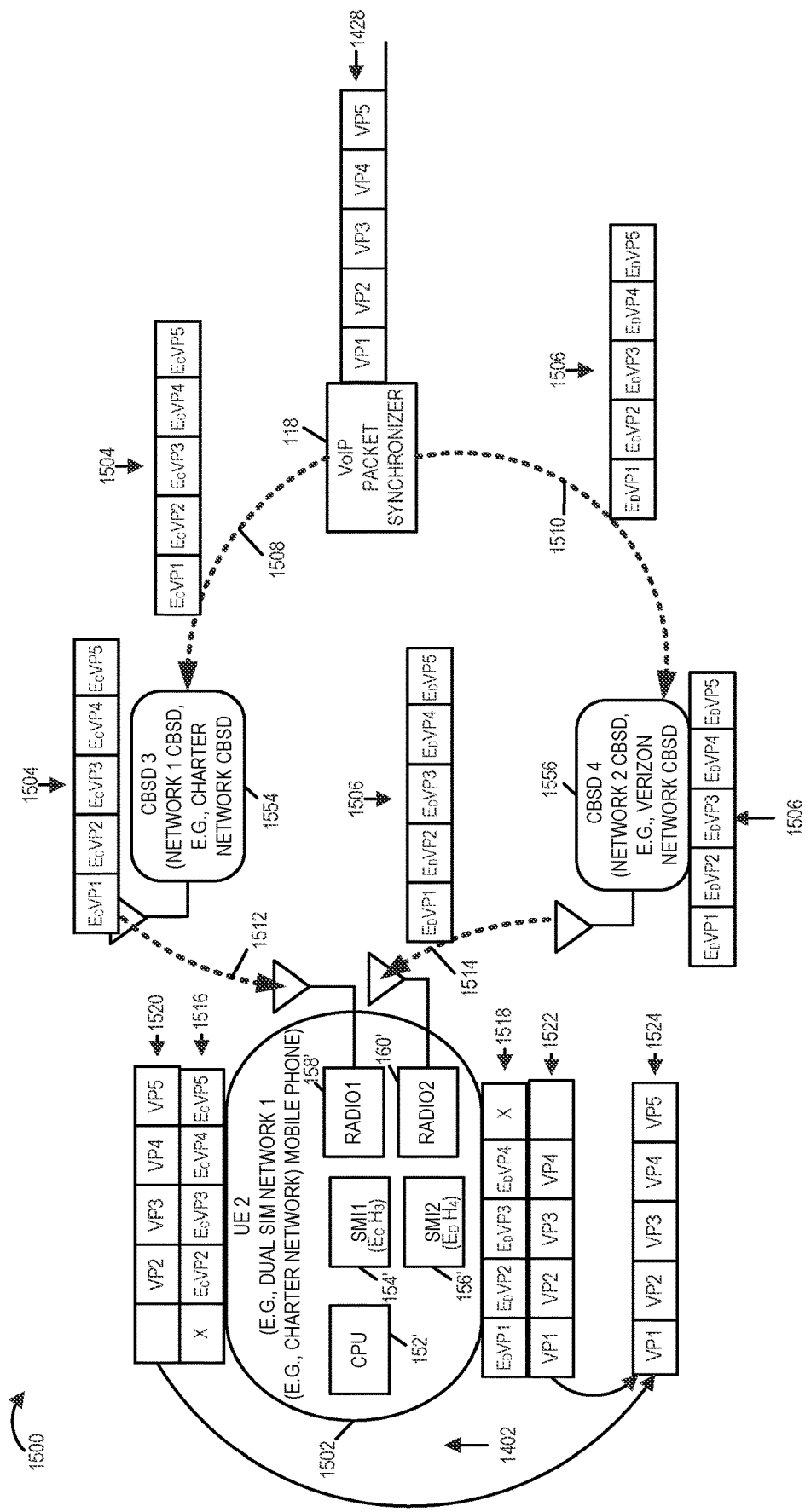
FIG. 15, which is a continuation of the example of FIG. 14, is a drawing used to illustrate an example in which two dual SIM UEs, each communicate voice data redundantly via multiple CBSDs, and the packet synchronizer serves and an intermediary device performing decryption and encryption operations, to provide secure reliable communications in accordance with an exemplary embodiment.

FIG. 15, which is a continuation of the example of FIG. 14, is a drawing 1500 used to illustrate an example in which two dual SIM UEs, each communicate voice data redundantly via multiple CBSDs, and the packet synchronizer 118 serves as an intermediary device performing decryption and encryption operations, to provide secure reliable communications in accordance with an exemplary embodiment. Consider that first dual SIM UE device is dual SIM UE 1 102, as shown in drawing 1400 of FIG. 14, and the second dual SIM UE device is UE 2 1502 shown in drawing 1500 of FIG. 15. Dual SIM UE 2 1502 includes a CPU 152', SIM 1 154', SIM 2 156', radio 1 158' and radio 2 160'. Drawing 1500 of FIG. 15 further includes CBSD 3 1554 of network 1 and CBSD 4 1556 of network 2. In this example dual SIM UE 2 1502 monitors to receive encrypted voice data packets from two different CBSDs (CBSD 3 1554, CBSD 4 1556) of two different networks (network 1, network 2), respectively, and some of the encrypted data packets are not successfully communicated, however, the full voice data stream is recovered by the dual SIM UE 1502, in accordance with an exemplary embodiment.

SIM 1 154', corresponding to radio 1 158', includes information identifying that the encryption algorithm C is used for encrypting voice data sent from CBSD 3 1554 of network 1 to radio 1 158' of UE 2 1502 and that frequency hopping pattern H3 is to be used for the communications via radio 1 158' with CBSD 3 1554. SIM 2 156', corresponding to radio 2 160', includes information identifying that the encryption algorithm D is used for encrypting voice data sent from CBSD 4 1556 of network 2 to radio 2 160' of UE 2 1502 and that frequency hopping pattern H4 is to be used for the communications via radio 2 160' with CBSD 4 1556.

VoIP packet synchronizer 118 has the recovered unencrypted voice packet stream 1428 (end result of FIG. 14), which originated from UE 1 102 and is intended to be delivered to end user UE 2 1502. Packet synchronizer 118 encrypts, using encryption algorithm C, unencrypted voice packets (VP1, VP2, VP3, VP4, VP5) 1428 to generate encrypted voice packets (ECVP1, ECVP2, ECVP3, ECVP4, ECVP5) 1504. Similarly, packet synchronizer 118 encrypts, using encryption algorithm D, unencrypted voice packets (VP1, VP2, VP3, VP4, VP5) 1428 to generate encrypted voice packets (EDVP1, EDVP2, EDVP3, EDVP4, EDVP5) 1506. Packet synchronizer 118 generates and sends signal 1508 to CBSD 3 1554 communicating the encrypted voice packets (ECVP1, ECVP2, ECVP3, ECVP4, ECVP5) 1504 to CBSD 3 1554 of network I which recovers the packets. Packet synchronizes 118 generates and sends signal 1510 to CBSD 4 1556 communicating the encrypted voice packets (EDVP1, EDVP2, EDVP3, EDVP4, EDVP5) 1506 to CBSD 4 1556 of network 2 which recovers the packets.

CBSD 3 1554, generates, using frequency hopping pattern H3 information, signals 1512, which convey encrypted voice packets (ECVP1, ECVP2, ECVP3, ECVP4, ECVP5) 1504, and transmits signals 1512 directed to UE 2 1502. In this example, encrypted packets ECVP2, ECVP3, ECVP4 and ECVP5 are successfully recovered by UE 2 1502: however, encrypted packet ECVP1 is not successfully recovered, as indicated by blocks 1516, e.g., do to noise or interference on the channel between CBSD 3 1554 and UE 2 1502. UE 2 1502 performs decryption, to recover unencrypted packets (VP2, VP3, VP4, and VP5) as indicated by blocks 1520.

CBSD 4 1556, generates, using frequency hopping pattern H4 information, signals 1514, which convey encrypted voice packets (EDVP1, EDVP2, EDVP3, EDVP4, EDVP5) 1506, and transmits signals 1514 directed to UE 2 1502. In this example, encrypted packets EDVP1, EDVP2, EDVP3 and ECVP4 are successfully recovered by UE 2 1502: however, encrypted packet ECVP5 is not successfully recovered, as indicated by blocks 1518, e.g., do to noise or interference on the channel between CBSD 4 1556 and UE 2 1502. UE 2 1502 performs decryption, to recover unencrypted packets (VP2, VP3, VP3, and VP4) as indicated by blocks 1523.

UE 2 1502 combines the two sets of successfully recovered decrypted packets (1520, 1522) to generate a single unencrypted voice packet stream (VP1, VP2, VP3, VP4, VP5) 1524.

Figure 16:
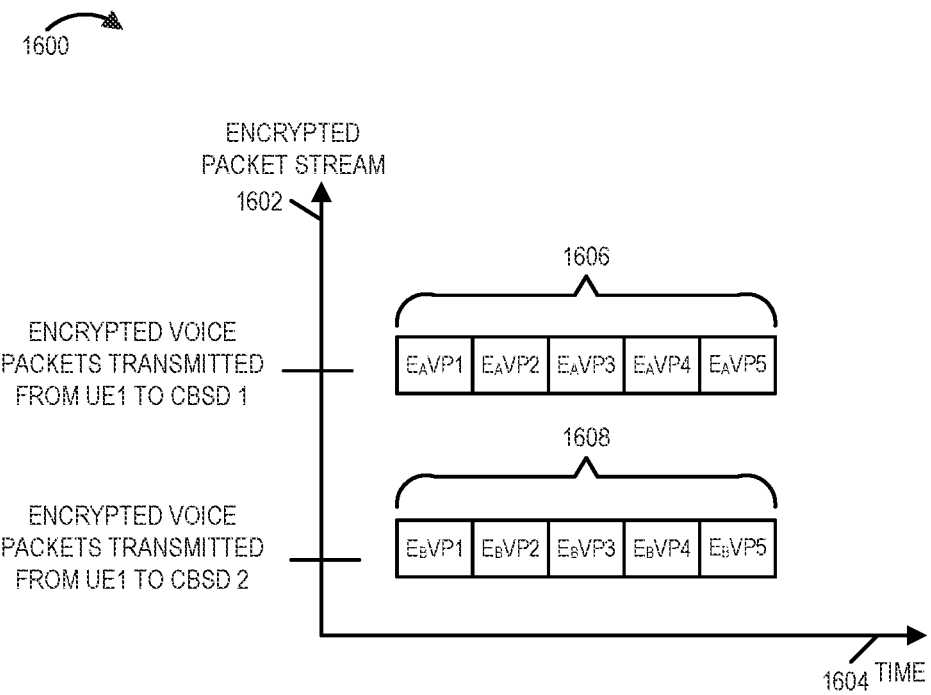
FIG. 16 illustrates an example in which a dual SIM UE transmits encrypted voice data packets, using two different encryption algorithms to two different CBSDs of two different networks, with corresponding encrypted voice packets, conveying the same unencrypted data, being transmitted concurrently in accordance with an exemplary embodiment.

FIG. 16 is a drawing 1600 illustrating an example in which a dual SIM UE device (UE 1) transmits encrypted voice data packets, using two different encryption algorithms (A and B) to two different CBSDs (CBSD 1, CBSD 2) of two different networks, with corresponding encrypted voice packets, conveying the same unencrypted data, being transmitted concurrently in accordance with an exemplary embodiment. The dual SIM UE is, e.g., UE 1 102 of FIGS. 1, 3, 4 and 14. CBSD 1 is, e.g., CBSD 1 104 of first network, and CBSD 2 is, e.g., CBSD 2 106 of second network of FIGS. 1, 3, 4 and 14.

Vertical axis 1602 represented encrypted packet stream, while horizontal axis 1604 represents time. Encrypted voice packet stream 1606, which is transmitted from UE 1 to CBSD 1 includes voice packets (EAVP1, EAVP2, EAVP3, EAVP4, EAVP5) which have been encrypted using encryption algorithm A. Encrypted voice packet stream 1608, which is transmitted from UE 1 to CBSD 2 includes voice packets (EBVP1, EBVP2, EBVP3, EBVP4, EBVP5) which have been encrypted using encryption algorithm B. EAVP1 conveys the same unencrypted voice data as EBVP1. EAVP2 conveys the same unencrypted voice data as EBVP2. EAVP3 conveys the same unencrypted voice data as EBVP3. EAVP4 conveys the same unencrypted voice data as EBVP4. EAVP5 conveys the same unencrypted voice data as EBVP5.

Figure 17:
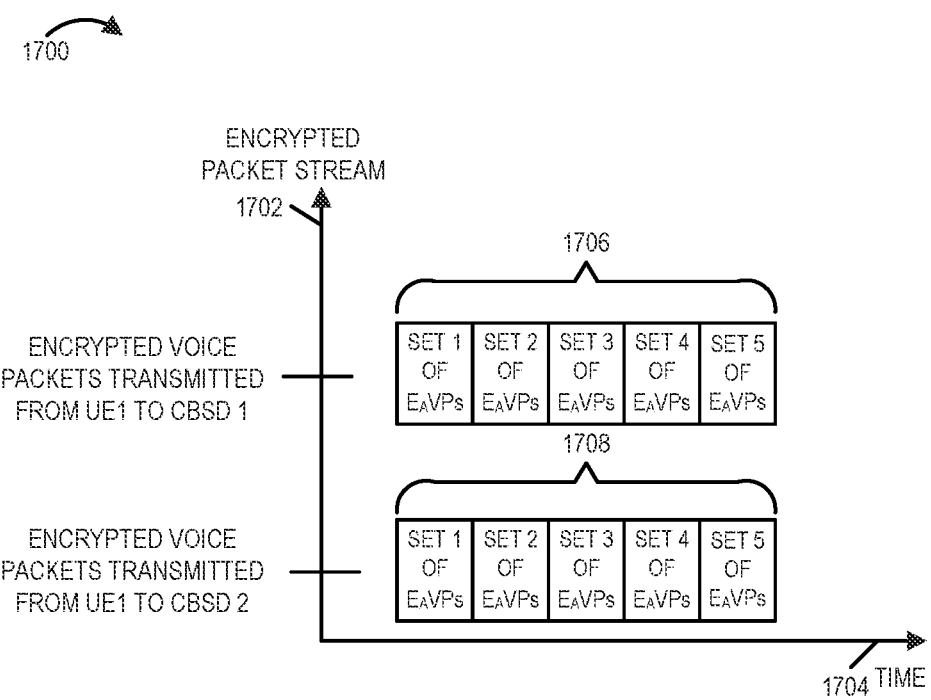
FIG. 17 illustrates an example in which a dual SIM UE transmits encrypted voice data packets, using two different encryption algorithms to two different CBSDs of two different networks, with corresponding sets of encrypted voice packets, conveying the same unencrypted data, being transmitted concurrently in accordance with an exemplary embodiment.

FIG. 17 is a drawing 1700 illustrates an example in which a dual SIM UE (UE 1) transmits encrypted voice data packets, using two different encryption algorithms (A and B) to two different CBSDs (CBSD 1, CBSD 2) of two different networks, with corresponding sets of encrypted voice packets, conveying the same unencrypted data, being transmitted concurrently in accordance with an exemplary embodiment. The dual SIM UE is, e.g., UE 1 102 of FIGS. 1, 3, 4 and 14. CBSD 1 is, e.g., CBSD 1 104 of first network, and CBSD 2 is, e.g., CBSD 2 106 of second network of FIGS. 1, 3, 4, and 14.

Vertical axis 1702 represented encrypted packet stream, while horizontal axis 1704 represents time. Encrypted voice packet stream 1706, which is transmitted from UE 1 to CBSD 1 includes sets of encrypted voice packets (set 1 of EAVPs, set 2 EAVPs, set 3 EAVPs, set 4 of EAVPs, set 5 of EAVPs) which have been encrypted using encryption algorithm A. Encrypted voice packet stream 1708, which is transmitted from UE 1 to CBSD 2 includes sets of encrypted voice packets (set 1 EBVPs, set 2 EBVPs, set 3 EBVPs, set 4 EBVPs, set 5 EBVPs) which have been encrypted using encryption algorithm B. Set 1 EAVPs conveys the same unencrypted voice data as set 1 EBVPs. Set 2 EAVPs conveys the same unencrypted voice data as set 2 EBVPs. Set 3 EAVPs conveys the same unencrypted voice data as Set 3 EBVPs. Set 4 EAVPs conveys the same unencrypted voice data as set 4 EBVPs. Set 5 EAVPs conveys the same unencrypted voice data as set 5 EBVPs.

Figure 18:
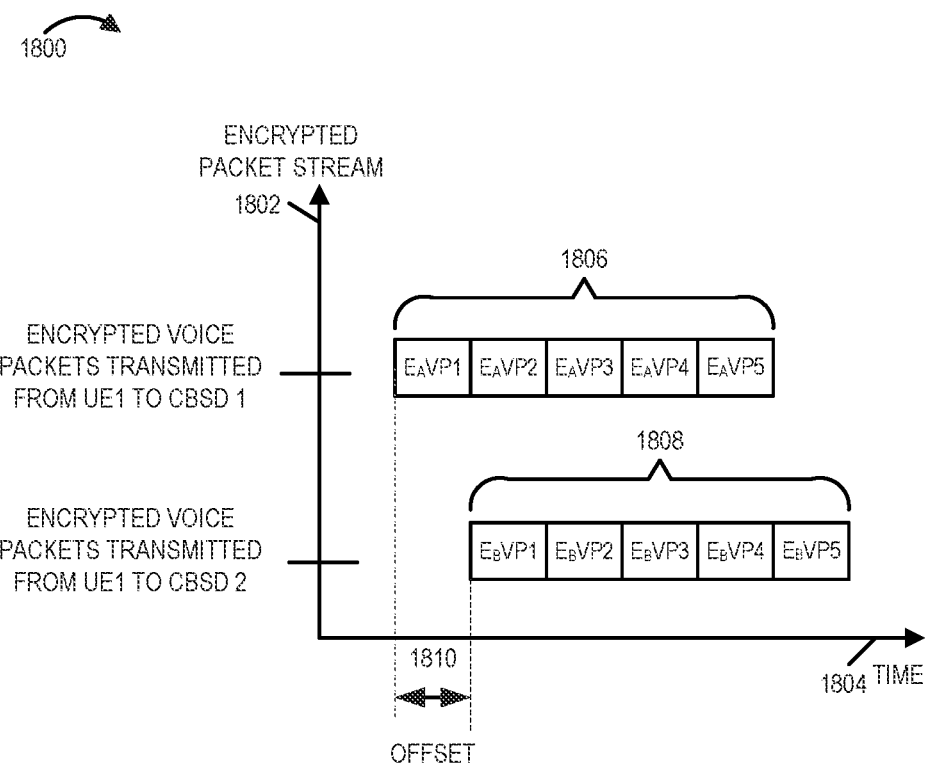
FIG. 18 illustrates an example in which a dual SIM UE transmits encrypted voice data packets, using two different encryption algorithms to two different CBSDs of two different networks, with corresponding encrypted voice packets, conveying the same unencrypted data, being transmitted offset in time in accordance with an exemplary embodiment.

FIG. 18 is a drawing 1800 illustrates an example in which a dual SIM UE (UE 1) transmits encrypted voice data packets, using two different encryption algorithms (A and B) to two different CBSDs (CBSD 1, CBSD 2) of two different networks, with corresponding encrypted voice packets, conveying the same unencrypted data, being transmitted offset in time in accordance with an exemplary embodiment. The dual SIM UE is, e.g., UE 1 102 of FIGS. 1, 3, 4 and 14. CBSD 1 is, e.g., CBSD 1 104 of first network, and CBSD 2 is, e.g., CBSD 2 106 of second network of FIGS. 1, 3, 4 and 14.

Vertical axis 1802 represented encrypted packet stream, while horizontal axis 1804 represents time. Encrypted voice packet stream 1806, which is transmitted from UE 1 to CBSD 1 includes voice packets (EAVP1, EAVP2, EAVP3, EAVP4, EAVP5) which have been encrypted using encryption algorithm A. Encrypted voice packet stream 1808, which is transmitted from UE 1 to CBSD 2 includes voice packets (EBVP1, EBVP2, EBVP3, EBVP4, EBVP5) which have been encrypted using encryption algorithm B. EAVP1 conveys the same unencrypted voice data as EBVP1. EAVP2 conveys the same unencrypted voice data as EBVP2. EAVP3 conveys the same unencrypted voice data as EBVP3. EAVP4 conveys the same unencrypted voice data as EBVP4. EAVP5 conveys the same unencrypted voice data as EBVP5. Encrypted packet stream 1808 is controlled to be transmitted with a time delay of offset 1810 with respect to encrypted packet stream 1806.

Figure 19:
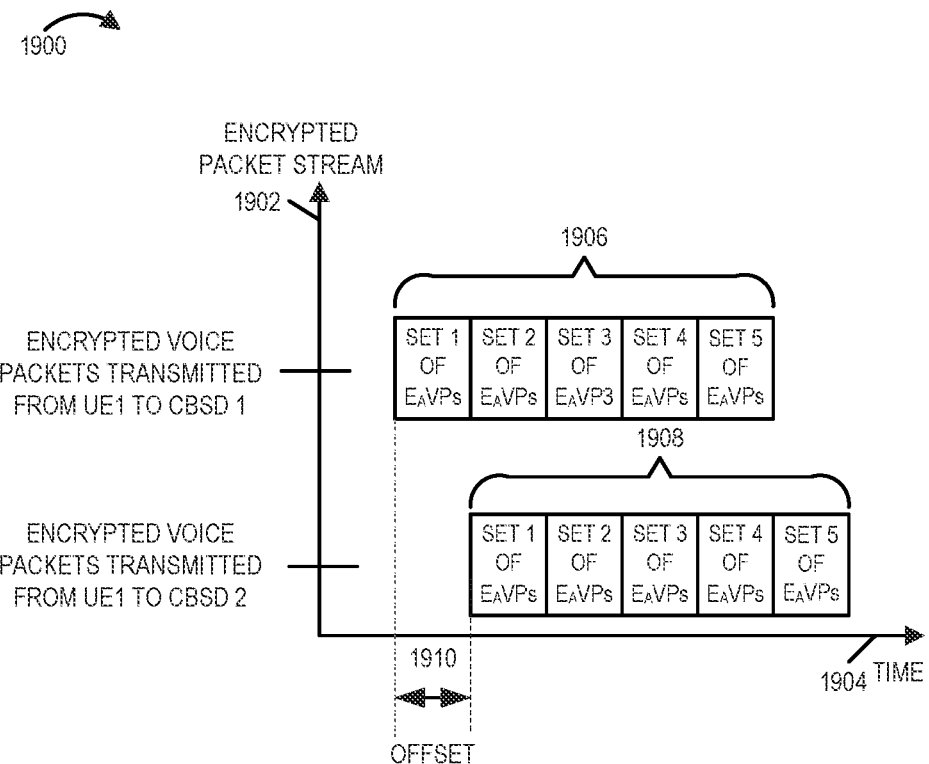
FIG. 19 illustrates an example in which a dual SIM UE transmits encrypted voice data packets, using two different encryption algorithms to two different CBSDs of two different networks, with corresponding sets of encrypted voice packets, conveying the same unencrypted data, being transmitted offset in time in accordance with an exemplary embodiment.

FIG. 19 is a drawing 1900 used to illustrate an example in which a dual SIM UE (UE 1) transmits encrypted voice data packets, using two different encryption algorithms (A and B) to two different CBSDs (CBSD 1, CBSD 2) of two different networks, with corresponding sets of encrypted voice packets, conveying the same unencrypted data, being transmitted offset in time in accordance with an exemplary embodiment. The dual SIM UE is, e.g., UE 1 102 of FIGS. 1, 3, 4 and 14. CBSD 1 is, e.g., CBSD 1 104 of first network, and CBSD 2 is, e.g., CBSD 2 106 of second network of FIGS. 1, 3, 4 and 14.

Vertical axis 1902 represented encrypted packet stream, while horizontal axis 1904 represents time. Encrypted voice packet stream 1906, which is transmitted from UE 1 to CBSD 1 includes sets of encrypted voice packets (set 1 of EAVPs, set 2 EAVPs, set 3 EAVPs, set 4 of EAVPs, set 5 of EAVPs) which have been encrypted using encryption algorithm A. Encrypted voice packet stream 1908, which is transmitted from UE 1 to CBSD 2 includes sets of encrypted voice packets (set 1 EBVPs, set 2 EBVPs, set 3 EBVPs, set 4 EBVPs, set 5 EBVPs) which have been encrypted using encryption algorithm B. Set 1 EAVPs conveys the same unencrypted voice data as set 1 EBVPs. Set 2 EAVPs conveys the same unencrypted voice data as set 2 EBVPs. Set 3 EAVPs conveys the same unencrypted voice data as Set 3 EBVPs. Set 4 EAVPs conveys the same unencrypted voice data as set 4 EBVPs. Set 5 EAVPs conveys the same unencrypted voice data as set 5 EBVPs. Encrypted packet stream 1908 is controlled to be transmitted with a time delay of offset 1910 with respect to encrypted packet stream 1906.

In some embodiments, the approach of FIG. 16 and FIG. 17 is used where the times of disruption in communications over the channel between UE 1 and CBSD 1 are expected to be random independent events with regard to the time of disruption in communications over the channel between UE 1 and CBSD 2, e.g., with a high likelihood. Thus, if a failure occurs on one channel (e.g., UE to CBSD 1) resulting in loss of an encrypted packet on that channel, the corresponding encrypted packet on the other channel (e.g., UE 1 to CBSD 2) is likely to get through on the second channel, and a packet synchronizer downstream of the CBSDs can recover the unencrypted voice data without loss.

In some embodiments, the approach of FIG. 18 and FIG. 19 is used where the times of disruption in communications over the channel between UE 1 and CBSD 1 is expected to be the same or approximately the same times of disruption in communications over the channel between UE 1 and CBSD 2, e.g., with a high likelihood. Thus, if a failure occurs on one channel (e.g., UE to CBSD 1) resulting in loss of an encrypted packet on that channel, the corresponding encrypted packet on the other channel (e.g., UE 1 to CBSD 2) is likely to get through on the second channel, since corresponding packets are transmitted at different times, and a packet synchronizer downstream of the CBSDs can recover the unencrypted voice data without loss.

In some embodiments, the UE supports both approaches: i) concurrent transmission of corresponding encrypted voice data packets on two channels and i) a timing offset between transmission of corresponding encrypted voice data packets with respect to the two channels. In some such embodiments, the UE can, and sometimes does, switches between no offset and an offset as a function of the channel conditions or expected channel conditions, e.g., based on channel feedback information and/or detected failures or detected failure patterns, and/or based on the location of each of the CBSDs with respect to the UE, and/or based on the direction of each CBSD with respect to the UE.

Various aspects and/or features of some embodiments of the present invention are further described below. Some features are directed to security aspects of the wireless traffic of a service provider's subscribers. For voice communication specifically, it is desirable to have the most secure voice communication network and the phone. In some embodiments, a service provider implements one or more features of an embodiment of the present invention, e.g., methods and/or apparatus to provide more reliable and/or more secure CBRS communications, advertises the service and charges a subscriber for the service, e.g., to monetize the service provider's CBRS network investment.

A brief background information description on VOLTE and novel features of an exemplary approach in accordance with the present invention will now be described.

An exemplary method, in accordance with some embodiments, includes using a dual SIM phone to secure voice communication, e.g., over wireless CBRS communications links, e.g. a first CBRS wireless link with a first service provider CBSD and a second CBRS wireless link with a second service provider CBSD.

In LTE, voice communication is IP packet based and it is named as Voice over LTE (VOLTE). For voice communication, network requires IMS, and IMS handles all IP based voice communication in LTE networks, and it is same for various exemplary CBRS networks.

In a LTE network, data communication is delivered under quality classification called Best Effort (BE). In plain English, best effort means, a base station will transmit as much as base station can transit as long as the base station has resources to transmit. If base station does not have resources to send data to user: there will not be data transmission or there will be very limited amount of data transmission.

For voice, quality class is different, and it is not best effort (BE). Voice uses QCI1 quality class, and voice traffic is delay sensitive traffic. So, voice traffic does not require large bandwidth to be transmitted. Voice traffic bandwidth is sometimes referred to as bandwidth N Mhz, or for simplicity a single user will take 2 MHz. This means 2 MHz is enough to transmit voice traffic to a single user in the network. CBRS air link resources may be, and sometimes are, allocated by a spectrum access system to one or more CBSDs, e.g. in 10 MHz blocks.

An exemplary first network is a first service provider's network, e.g., a Charter network, and an exemplary second network is a second service provider's network, e.g. a Verizon wireless, network.

Various features and/or aspects of an exemplary method for secure voice communication in the first service provider's, e.g., Charter's, CBRS network will now be described.

A Dual SIM user equipment (UE), e.g., first network dual SIM mobile phone, can, and sometimes does, stay connected to two networks, e.g., the first and second networks, at the same time. In some embodiments, the two different networks will apply different encryption algorithms to voice traffic going to a single user. There will be a VoIP packet synchronizer, e.g. between core networks of the first and second service providers, e.g. Charter and Mobile Network Operation (MNO) Verizon Wireless (VzW). In some embodiments, the VoIP packet synchronizer is located in the first service provider's core network.

In some embodiments, A SAS assigns a 10 MHz block of spectrum to a particular CBSD. Since 2 MHz is needed to deliver voice traffic to a user, there will be 5 voice channels in the network. For a 20 MHz SAS assignment to a particular CBSD, there will be 10 voice channels. Each voice user in the network will use specific hopping pattern to send and to receive data from smallcell (e.g., CBSD), and smallcell (e.g., CBSD) will also use specific hopping pattern to send voice data to voice users. This data pattern is determined, e.g., initially, by the SAS for each smallcell and for each user in the coverage of a smallcell. In some embodiments, the SAS changes this pattern based on a frequency determined by the first network service provider.

Once a voice user is connected to the first network, a certain type of encryption algorithm will be used to encrypt user's voice data. Similarly, once the voice user is connected to the second network, a certain type of encryption algorithm will be used to encrypt user's voice data. In some embodiments, encryption algorithms used by different networks are different, e.g., the same UE device uses a different encryption algorithm when communicating with a first CBSD in the first network than when communicating with a second CBSD in the second network. In some embodiments, encryption algorithms used can be, and sometimes are, different, e.g., for different smallcells (CBSDs), different locations, and/or different times.

In some embodiments, when a user, connects to the first network, the first network will send voice traffic to the user, and first network will also send the same copy of the traffic to second network. In some embodiments, the VoIP packet synchronizer will convert between different encryption algorithms used by the first and second networks. In some embodiments, the VoIP packet synchronizer will process a received unencrypted voice packet for the user and generate: i) a encrypted VoIP packet using a first encryption algorithm corresponding to the first network, and ii) an encrypted VoIP packet using a second encryption algorithm corresponding to the second network. Thus the same unencrypted voice packet information will be sent to the voice user twice, once by the first network and once by the second network, e.g., via different encrypted packets, at the same time, or with a slight delay so that if user can not receive one of the voice packets, the user can use the other one of the voice packet provided that packet is successfully recovered. This approach is implemented to reduce latency, and re-transmissions in the network. Since encryption introduces delay because of additional processing, this measure is implemented, in some embodiments, to compensate for this extra delay in the network.

So, now in various embodiments, in accordance with the present invention there are two networks transmitting to a single voice user whose dual SIM card will receive data from first and second networks.

Since a voice user will use any chunk of spectrum for a duration of time, e.g. a randomly selected duration of time, any third party who is not the intended recipient of the voice data have to find out which chunk of the spectrum that voice user is currently using, and which encryption algorithm the network is using to send the data. A network can, and sometimes does, change the encryption algorithm when the spectrum chunk used has changed. So, if unintended receipt is busy with decrypting the voice data, before it is done: frequency and the encryption algorithm will change, and decryption operation will be unsuccessful.

Since the frequency hopping pattern is kept in the SAS server, this might create a single point of attack if an unintended recipient wants to learn what the pattern is. However, in some embodiments, this hopping pattern also changes based on each SIM radio of the terminals. That is one SIM in a UE device can, and sometimes does, have a different frequency hopping pattern than the other SIM in the UE device, or both SIMs can both have the same pattern. In some embodiments, once the voice communication starts with a specific frequency hopping pattern sent from SAS, the UE, e.g. mobile dual SIM phone, can and sometimes does, change this hopping pattern at any time by signaling the SAS the next hopping pattern. In some embodiments, this new hopping pattern will be kept in SAS memory not the database: therefore changes in the hopping pattern will not be visible in the database, where unintended recipient mostly looks for information.

Numbered List of Exemplary Method Embodiments

Method Embodiment 1 A communications method, the method comprising: receiving (204) at a first user equipment (UE) device (corresponding to a first end of a call), via a first radio receiver corresponding to a first communications network (radio one) and a first Subscriber Identity Module (SIM), first frequency hopping pattern information, said first frequency hopping pattern information indicating a frequency hopping pattern used for communication with the first network: receiving (206) at the first user equipment device, via a second radio receiver corresponding to a second communications network (radio two) and a second Subscriber Identity Module (SIM), second frequency hopping pattern information, said second frequency hopping pattern information indicating a frequency hopping pattern used for communication with the second network: transmitting (212), from the first user equipment device, using frequencies determined from the first frequency hopping pattern information, first voice data to the first network, said first voice data being directed to a second UE device (other end of a call); and transmitting (212), from the first user equipment device, using frequencies determined from the second frequency hopping pattern information, said first voice data to the second network.

Method Embodiment 2 The method of Method Embodiment 1, wherein transmitting (212), from the first user equipment device, using frequencies determined from the first frequency hopping pattern information, first voice data to the first network includes: encrypting (216) the first voice data in accordance with a first encryption algorithm; and transmitting (218) the first voice data in encrypted form to a first CBSD which is in the first network.

Method Embodiment 3 The method of Method Embodiment 2, wherein transmitting (214), from the first user equipment device, using frequencies determined from the second frequency hopping pattern information, said first voice data to the second network includes: encrypting (220) the first voice data in accordance with a second encryption algorithm; and transmitting (222) the first voice data in encrypted form to a second CBSD which is in the second network.

Method Embodiment 3A The method of Method Embodiment 3, further comprising: operating (224,226) a packet synchronizer to receive at least one of: i) at least some of the first voice data encrypted in accordance with the first encryption algorithm from the first CBSD: or ii) at least some of the first voice data encrypted in accordance with the second encryption algorithm from the second CBSD: operating (230) the packet synchronizer to generate a first voice data packet stream from the first voice data received from one or both of the first and second networks; and operating (238) the packet synchronizer to send the generated first voice data packet stream to the second UE device.

Method Embodiment 4 The method of Method Embodiment 3, further comprising: operating (224) a packet synchronizer to receive at least some of the first voice data encrypted in accordance with the first encryption algorithm from the first CBSD: operating (226) the packet synchronizer to receive at least some of the first voice data encrypted in accordance with the second encryption algorithm from the second CBSD: operating (230) the packet synchronizer to generate a first voice data packet stream from the first voice data received from the first and second networks; and operating (238) the packet synchronizer to send the generated first voice data packet stream to the second UE device.

Method Embodiment 5 The method of Method Embodiment 4, wherein operating (230) the packet synchronizer to generate a first voice data packet stream from the first voice data received from the first and second networks includes: decrypting (232) the encrypted first voice data received via the first network in accordance with the first encryption algorithm to recover a first set of audio packets: decrypting (234) the encrypted first voice data received via the second network in accordance with the second encryption algorithm to recover a second set of audio packets, said second set of audio packets including a copy of at least some audio packets included in said first set of audio packets; and including (236) a single copy of each unique packet of voice data included in either of said first and second sets of audio packets in said first voice data packet stream sent to the second UE device.

Method Embodiment 6 The method of Method Embodiment 5, further comprising: operating (278) the first UE to send a first hopping pattern change message to the first communications network indicating a change to be made to the frequency hopping pattern used by the first UE to communicate with the first network.

Method Embodiment 7 The method of Method Embodiment 6, wherein operating (278) the first UE to send the first hopping pattern change message to the first communications network indicating a change to be made to the frequency hopping pattern used by the first UE to communicate with the first network includes: operating (282) the first UE to send the hopping pattern change message to the first CBSD indicating a first new frequency hopping pattern to be used; and wherein the method further comprises: operating (284) the first CBSD to communicate the first hopping pattern change message to an SAS.

Method Embodiment 8 The method of Method Embodiment 7, further comprising: operating (286) the first CBSD to receive a change message from said SAS indicating that the hopping pattern change is to be implemented (e.g., a request response indicating granting of a change requested in frequencies to be used to support the new hopping pattern): operating (288) the first CBSD to indicate to the first UE that the first hopping pattern change is to be implemented; and operating (290) the first UE to communicate with the first network using the first new hopping pattern following the receipt of the indication that the first hopping pattern change is to be Method Embodiment 9 The method of Method Embodiment 6, further comprising: operating (280) the first UE to send a second hopping pattern change message to the second communications network indicating a change to be made to the frequency hopping pattern used by the first UE to communicate with the second network.

Method Embodiment 10 The method of Method Embodiment 9, wherein operating (280) the first UE to send the second hopping pattern change message to the second communications network indicating a change to be made to the frequency hopping pattern used by the first UE to communicate with the second network includes: operating (292) the first UE to send the second hopping pattern change message to the second CBSD indicating a second new frequency hopping pattern to be used; and wherein the method further comprises: operating (294) the second CBSD to communicate the second hopping pattern change message to the SAS.

Method Embodiment 11 The method of Method Embodiment 10, further comprising: operating (295) the first CBSD to receive a change message from said SAS indicating that the second hopping pattern change is to be implemented (e.g., a request response indicating granting of a change requested in frequencies to be used to support the new hopping pattern): operating (296) the second CBSD to indicate to the first UE that the second hopping pattern change is to be implemented; and operating (297) the first UE to communicate with the second network using the second new hopping pattern following the receipt of the indication that the second hopping pattern change is to be implemented.

Numbered List of Exemplary System Embodiments

System Embodiment 1 A communications system (100) comprising: a first user equipment (UE) device (102 or 500) including: a first processor (152 or 502): a first radio receiver (516); a first Subscriber identity module (SIM) (154 or 560): a first radio transmitter (518): a second radio receiver (556): a second Subscriber identity module (SIM) (156 or 562): a second radio transmitter (558); and wherein said first radio receiver corresponds to a first communications network and said first SIM: wherein said first radio transmitter corresponds to said first communications network and said first SIM: wherein said second radio receiver corresponds to a second communications network and said second SIM: wherein said second radio transmitter corresponds to said second communications network and said second SIM; and wherein said first processor (502) is configured to: operate said first radio receiver to receive (204) first frequency hopping pattern information, said first frequency hopping pattern information indicating a frequency hopping pattern used for communication with the first network: operate said second radio receiver to receive (206) second frequency hopping pattern information, said second frequency hopping pattern information indicating a frequency hopping pattern used for communication with the second network: operate the first UE device to transmit (212), from the first UE device, using frequencies determined from the first frequency hopping pattern information, first voice data to the first network, said first voice data being directed to a second UE device (other end of a call); and operate the first UE device to transmit (214), from the first user equipment device, using frequencies determined from the second frequency hopping pattern information, said first voice data to the second network.

System Embodiment 2 The communications system (100) of System Embodiment 1, wherein said first processor (502) is configured to: encrypt (216) the first voice data in accordance with a first encryption algorithm; and operate the first radio transmitter to transmit (218) the first voice data in encrypted form to a first CBSD (104 or 900) which is in the first network, as part of being configured to operate the first UE to transmit (212), from the first user equipment device, using frequencies determined from the first frequency hopping pattern information, first voice data to the first network.

System Embodiment 3 The communications system (100) of System Embodiment 2, wherein said first processor (502) is configured to: encrypt (220) the first voice data in accordance with a second encryption algorithm; and operate the second radio transmitter to transmit (222) the first voice data in encrypted form to a second CBSD (106 or 1100) which is in the second network, as part of being configured to operate the first UE to transmit (214), from the first user equipment device, using frequencies determined from the second frequency hopping pattern information, said first voice data to the second network.

System Embodiment 3A The communications system (100) of System Embodiment 3, further comprising: a packet synchronizer (124 or 700) including a second processor (702); and wherein said second processor (702) is configured to: operate (224,226) the packet synchronizer to receive at least one of: i) at least some of the first voice data encrypted in accordance with the first encryption algorithm from the first CBSD: or ii) at least some of the first voice data encrypted in accordance with the second encryption algorithm from the second CBSD: operate (230) the packet synchronizer to generate a first voice data packet stream from the first voice data received from one or both of the first and second networks; and operate (238) the packet synchronizer to send the generated first voice data packet stream to the second UE device.

System Embodiment 4 The communications system (100) of System Embodiment 3, further comprising: a packet synchronizer (124 or 700) including a second processor (702); and wherein said second processor (702) is further configured to: operate (224) the packet synchronizer to receive at least some of the first voice data encrypted in accordance with the first encryption algorithm from the first CBSD: operate (226) the packet synchronizer to receive at least some of the first voice data encrypted in accordance with the second encryption algorithm from the second CBSD: operate (230) the packet synchronizer to generate a first voice data packet stream from the first voice data received from the first and second networks; and operate (238) the packet synchronizer to send the generated first voice data packet stream to the second UE device.

System Embodiment 5 The communications system (100) of System Embodiment 4, wherein said second processor (702) is configured to: decrypt (232) the encrypted first voice data received via the first network in accordance with the first encryption algorithm to recover a first set of audio packets: decrypt (234) the encrypted first voice data received via the second network in accordance with the second encryption algorithm to recover a second set of audio packets, said second set of audio packets including a copy of at least some audio packets included in said first set of audio packets; and include (236) a single copy of each unique packet of voice data included in either of said first and second sets of audio packets in said first voice data packet stream sent to the second UE device, as part of being configured to operate (230) the packet synchronizer to generate a first voice data packet stream from the first voice data received from the first and second networks.

System Embodiment 6 The communications system (100) of System Embodiment 5, wherein said first processor (502) is further configured to: operate (278) the first UE to send a first hopping pattern change message to the first communications network indicating a change to be made to the frequency hopping pattern used by the first UE to communicate with the first network.

System Embodiment 7 The communications system (100) of System Embodiment 6, further comprising: said first CBSD (104 or 900) including a third processor (902); and wherein said first processor (502) is configured to: operate (282) the first UE to send the hopping pattern change message to the first CBSD indicating a first new frequency hopping pattern to be used, as part of being configured to operate (278) the first UE to send the first hopping pattern change message to the first communications network indicating a change to be made to the frequency hopping pattern used by the first UE to communicate with the first network; and wherein said third processor (902) is configured to: operate (284) the first CBSD (104 or 900) to communicate the first hopping pattern change message to an SAS (124 or 1300).

System Embodiment 8 The communications system (100) of System Embodiment 7, wherein said third processor (902) is further configured to: operate (286) the first CBSD to receive a change message from said SAS indicating that the hopping pattern change is to be implemented (e.g., a request response indicating granting of a change requested in frequencies to be used to support the new hopping pattern): operate (288) the first CBSD to indicate to the first UE that the first hopping pattern change is to be implemented; and wherein said first processor (502) is further configured to: operate (290) the first UE to communicate with the first network using the first new hopping pattern following the receipt of the indication that the first hopping pattern change is to be implemented.

System Embodiment 9 The communications system (100) of System Embodiment 6, wherein said first processor (502) is further configured to: operate (280) the first UE to send a second hopping pattern change message to the second communications network indicating a change to be made to the frequency hopping pattern used by the first UE to communicate with the second network.

System Embodiment 10 The communications system (100) of System Embodiment 9, wherein said first processor (502) is further configured to: operate (292) the first UE to send the second hopping pattern change message to the second CBSD indicating a second new frequency hopping pattern to be used, as part of being configured to operate (280) the first UE to send the second hopping pattern change message to the second communications network indicating a change to be made to the frequency hopping pattern used by the first UE to communicate with the second network includes; and wherein the communications system (100) further comprises said second CBSD (106 or 1100) including a fourth processor (1102) configured to: operate (294) the second CBSD (106 or 1100) to communicate the second hopping pattern change message to the SAS (124 or 1300).

System Embodiment 11 The communications system (100) of claim 10, wherein said third processor (902) is further configured to: operate (295) the first CBSD (104 or 900) to receive a change message from said SAS indicating that the second hopping pattern change is to be implemented (e.g., a request response indicating granting of a change requested in frequencies to be used to support the new hopping pattern): wherein said fourth processor (1102) is further configured to: operate (296) the second CBSD (106 or 1100) to indicate to the first UE that the second hopping pattern change is to be implemented; and wherein said first processor (502) is further configured to: operate (297) the first UE to communicate with the second network using the second new hopping pattern following the receipt of the indication that the second hopping pattern change is to be implemented.

The techniques of various embodiments may be implemented using software, hardware and/or a combination of software and hardware. Various embodiments are directed to apparatus, e.g., user devices such as a user equipment (UE) device such as a dual SIM mobile end user device (EUD) supporting CBRS communications, base stations such as eNodeBs supporting CBRS communications serving as Citizens Broadband radio Services Devices (CBSDs), packet synchronizers, cellular base stations not servings as CBSD devices, network nodes, SAS systems, SAS servers, SAS databases, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, CBSDs, packet synchronizers, SAS devices, SAS databases, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, e.g., a user device, a CBSD, a packet synchronizer, a base station, a SAS, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
   receiving at a first user equipment (UE) device, via a first radio receiver corresponding to a first communications network and a first Subscriber Identity Module (SIM), first frequency hopping pattern information, said first frequency hopping pattern information indicating a frequency hopping pattern used for communication with the first communications network;
   receiving at the first UE device, via a second radio receiver corresponding to a second communications network and a second SIM, second frequency hopping pattern information, said second frequency hopping pattern information indicating a frequency hopping pattern used for communication with the second communications network;
   transmitting to a device in the first communications network, from the first UE device, using frequencies determined from the first frequency hopping pattern information;
   transmitting, from the first UE device, using frequencies determined from the second frequency hopping pattern information, to another device, said another device being in the second communications network; and
   operating the first UE device to send a first hopping pattern change request message directed to a spectrum access system (SAS) in the first communications network indicating a first new frequency hopping pattern to be used.

2. The communications method of claim 1, further comprising:
   operating the first UE device to receive a first frequency hopping change response message indicating that a change to the first new frequency hopping pattern is to be implemented.

3. The communications method of claim 2, wherein the first frequency hopping change response message indicates when the change to the first new frequency hopping pattern is to be implemented.

4. The communications method of claim 2, further comprising:
   operating the first UE device to communicate with the first communications network using the first new hopping pattern following the receipt of the first frequency hopping change response message indicating that the change to the first new frequency hopping pattern is to be implemented.

5. The communications method of claim 2, wherein transmitting to a device in the first communications network, from the first UE device, using frequencies determined from the first frequency hopping pattern information, includes:
   encrypting first voice data in accordance with a first encryption algorithm; and
   transmitting the first voice data in first encrypted form to a first Citizens Broadband Service Device (CBSD) which is in the first communications network.

6. The communications method of claim 5, wherein transmitting, from the first UE device, using frequencies determined from the second frequency hopping pattern information, includes:
   encrypting the first voice data in accordance with a second encryption algorithm; and
   transmitting the first voice data in second encrypted form to a second CBSD which is in the second communications network.

7. The communications method of claim 6,
   wherein operating the first UE device to send the first hopping pattern change request message directed to the SAS includes:
   operating the first UE device to send the first hopping pattern change request message via the first CBSD in the first communications network.

8. The communications method of claim 6, further comprising:
   operating the first UE device to send a second hopping pattern change request message to the second communications network indicating a change to be made to the second frequency hopping pattern used by the first UE device to communicate with the second communications network.

9. The communications method of claim 8,
   wherein operating the first UE device to send the second hopping pattern change request message to the second communications network includes:
   operating the first UE device to send the second hopping pattern change request message to the SAS via the second CBSD included in the second communications network.

10. The communications method of claim 9,
    wherein the second hopping pattern change request message indicates a second new frequency hopping pattern; and
    wherein the method further comprises:
    operating the first UE device to receive a second frequency hopping change response message indicating that a change to the second new frequency hopping pattern is to be implemented.

11. The communications method of claim 9, further comprising:
    operating the first UE device to communicate via the second CBSD using the second new frequency hopping pattern following receipt of the second frequency hopping change response message.

12. A first user equipment (UE) device comprising:
    a first processor;
    a first radio receiver;
    a first Subscriber Identity Module (SIM);
    a first radio transmitter;
    a second radio receiver;
    a second SIM;
    a second radio transmitter; and
    wherein said first radio receiver corresponds to a first communications network and said first SIM;

wherein said first radio transmitter corresponds to said first communications network and said first SIM;

wherein said second radio receiver corresponds to a second communications network and said second SIM;

wherein said second radio transmitter corresponds to said second communications network and said second SIM; and wherein said first processor is configured to control the first UE device to:
- receive, via the first radio receiver, first frequency hopping pattern information, said first frequency hopping pattern information indicating a frequency hopping pattern used for communication with the first communications network;
- receive, via the second radio receiver, second frequency hopping pattern information, said second frequency hopping pattern information indicating a frequency hopping pattern used for communication with the second communications network;
- transmit to a device in the first communications network, from the first UE device, using frequencies determined from the first frequency hopping pattern information;
- transmit, from the first UE device, using frequencies determined from the second frequency hopping pattern information, to another device, said another device being in the second communications network; and
- send a first hopping pattern change request message directed to a spectrum access system (SAS) in the first communications network indicating a first new frequency hopping pattern to be used.

13. The first UE device of claim 12,
wherein said first processor is further configured to control the first UE device to:
receive a first frequency hopping change response message indicating that a change to the first new hopping pattern is to be implemented.

14. The first UE device of claim 13, wherein the first frequency hopping change response message indicates when the change to the first new frequency hopping pattern is to be implemented.

15. The first UE device of claim 14, wherein said first processor is further configured to control the first UE device to:
communicate with the first communications network using the first new hopping pattern following the receipt of the first frequency hopping change response message indicating that the change to the first new frequency hopping pattern change is to be implemented.

16. The first UE device of claim 15, wherein said first processor is further configured to control the first UE device as part of transmitting, from the first UE device, using frequencies determined from the first frequency hopping pattern information, to the first communications network to:
encrypt first voice data in accordance with a first encryption algorithm; and
transmit the first voice data in first encrypted form to a first Citizens Broadband Service Device (CBSD) which is in the first communications network.

17. The first UE device of claim 16, wherein said first processor is further configured to control the first UE device to:
transmit using frequencies determined from the second frequency hopping pattern information, said first voice data to the second communications network;
encrypt the first voice data in accordance with a second encryption algorithm; and
transmit the first voice data in second encrypted form to a second CBSD which is in the second communications network.

18. The first UE device of claim 13, wherein said first processor is further configured to control the first UE device to:
send a second hopping pattern change request message to the SAS via a second Citizens Broadband Radio Service Device (CBSD) included in the second communications network.

19. The first UE device of claim 18,
wherein the second hopping pattern change request message indicates a second new frequency hopping pattern; and
wherein said first processor is further configured to control the first UE device to:
receive a second frequency hopping change response message indicating that a change to the second new frequency hopping pattern is to be implemented.

20. A non-transitory computer readable medium including computer executable instructions which, when executed by a processor of a first user equipment (UE) device, control the first UE device to perform the steps of:
receiving at the first UE device, via a first radio receiver corresponding to a first communications network and a first Subscriber Identity Module (SIM), first frequency hopping pattern information, said first frequency hopping pattern information indicating a frequency hopping pattern used for communication with the first communications network;
receiving at the first UE device, via a second radio receiver corresponding to a second communications network and a second SIM, second frequency hopping pattern information, said second frequency hopping pattern information indicating a frequency hopping pattern used for communication with the second communications network;
transmitting to a device in the first communications network, from the first UE device, using frequencies determined from the first frequency hopping pattern information;
transmitting, from the first UE device, using frequencies determined from the second frequency hopping pattern information, to another device, said another device being in the second communications network; and
operating the first UE device to send a hopping pattern change request message directed to a spectrum access system (SAS) in the first communications network indicating a first new frequency hopping pattern to be used.

\* \* \* \* \*